(12) United States Patent
Park et al.

(10) Patent No.: US 12,219,632 B2
(45) Date of Patent: Feb. 4, 2025

(54) METHOD OF MULTI-LINK POWER SAVE INDICATION

(71) Applicant: Intel Corporation, Santa Clara, CA (US)

(72) Inventors: Minyoung Park, San Ramon, CA (US); Laurent Cariou, Portland, OR (US); Po-Kai Huang, San Jose, CA (US); Alexander Min, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 790 days.

(21) Appl. No.: 17/121,355

(22) Filed: Dec. 14, 2020

(65) Prior Publication Data

US 2021/0100053 A1    Apr. 1, 2021

(51) Int. Cl.
*H04W 76/00* (2018.01)
*H04L 1/00* (2006.01)
*H04L 1/1607* (2023.01)
*H04W 52/02* (2009.01)
*H04W 76/15* (2018.01)

(52) U.S. Cl.
CPC .......... *H04W 76/15* (2018.02); *H04L 1/0007* (2013.01); *H04L 1/1614* (2013.01); *H04W 52/0206* (2013.01)

(58) Field of Classification Search
None
See application file for complete search history.

(56) References Cited

U.S. PATENT DOCUMENTS

| 11,445,431 B2* | 9/2022 | Patil ............... H04W 8/245 |
| 2006/0088020 A1* | 4/2006 | Gass ............... H04W 76/10 370/338 |
| 2019/0045520 A1* | 2/2019 | Venkatachalam Jayaraman ......... H04L 5/0092 |
| 2021/0144637 A1* | 5/2021 | Kwon ............... H04W 80/02 |
| 2023/0308938 A1* | 9/2023 | Sun ............... H04W 76/15 |

FOREIGN PATENT DOCUMENTS

WO    WO-2018131991 A1 *  7/2018 ......... H04L 27/0008

* cited by examiner

*Primary Examiner* — Gerald A Smarth
(74) *Attorney, Agent, or Firm* — Eversheds Sutherland (US) LLP

(57) ABSTRACT

This disclosure describes systems, methods, and devices related to multi-link power save indication. A device may establish two or more links with a non-access point (AP) multi-link device (MLD). The device may connect a first AP of the AP MLD to a first station device (STA) of the non-AP MLD using a first link. The device may connect a second AP of the AP MLD to a second STA of the non-AP MLD using a second link. The device may use a link bitmap field included in a frame, wherein the link bitmap field comprises a first bit associated with the first STA and a second bit associated with the second STA. The device may communicate with the non-AP MLD based on the link bitmap.

17 Claims, 16 Drawing Sheets

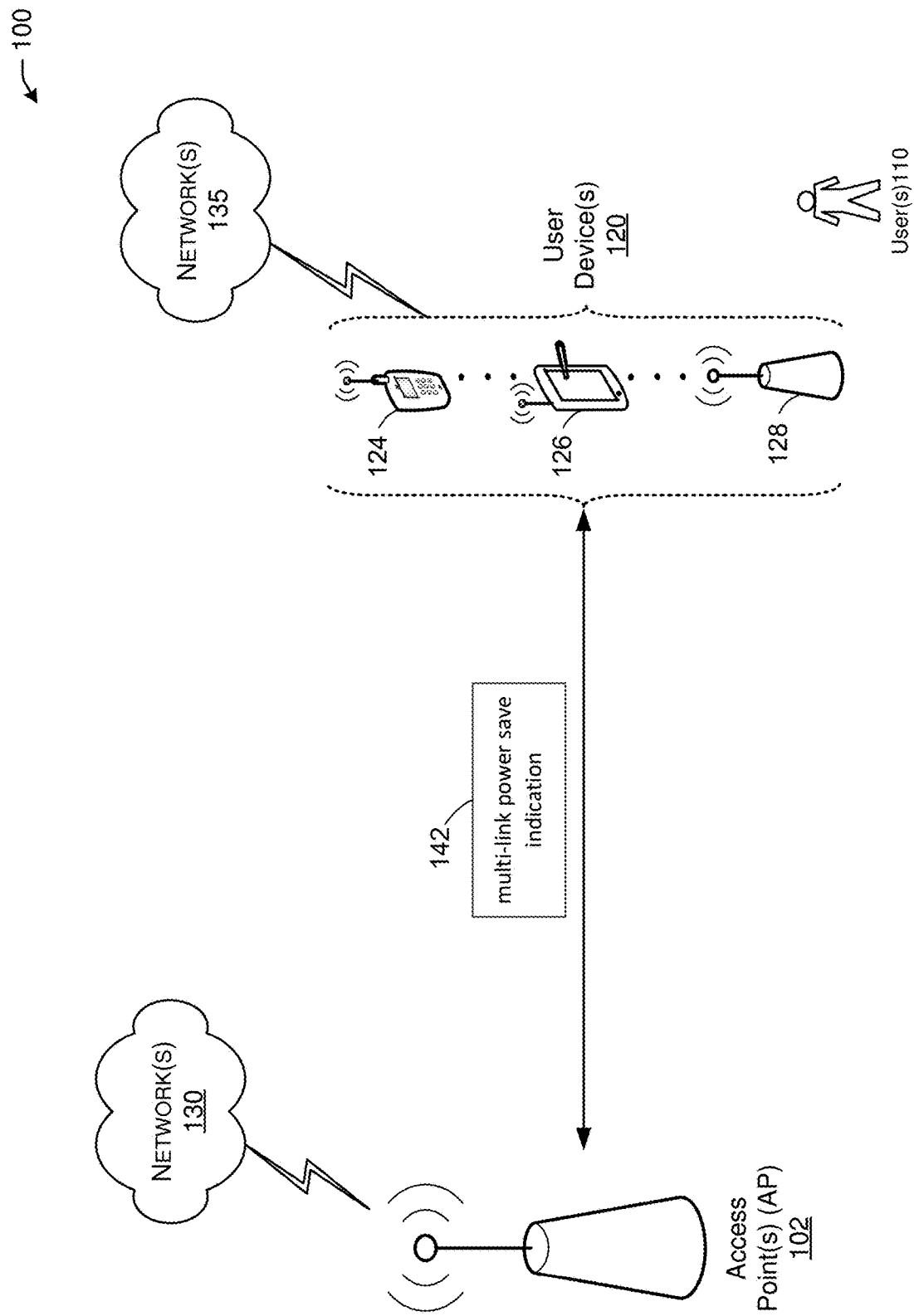

| MLPS Control subfield | | | |
|---|---|---|---|
| Control ID (MLPS) | Link Bitmap Size | Link Bitmap | Reserved |
| 4-bit | 2-bit | 2-16 bits | 8-22 bits |

METHOD OF MULTI-LINK POWER SAVE INDICATION

TECHNICAL FIELD

This disclosure generally relates to systems and methods for wireless communications and, more particularly, to multi-link power save indication.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

BRIEF DESCRIPTION OF THE DRAWINGS

FIG. 1A is a network diagram illustrating an example network environment for multi-link power save indication, in accordance with one or more example embodiments of the present disclosure.

FIG. 2 depicts an illustrative schematic diagram for a multi-link power save control subfield, in accordance with one or more example embodiments of the present disclosure.

DETAILED DESCRIPTION

Figure 1B:
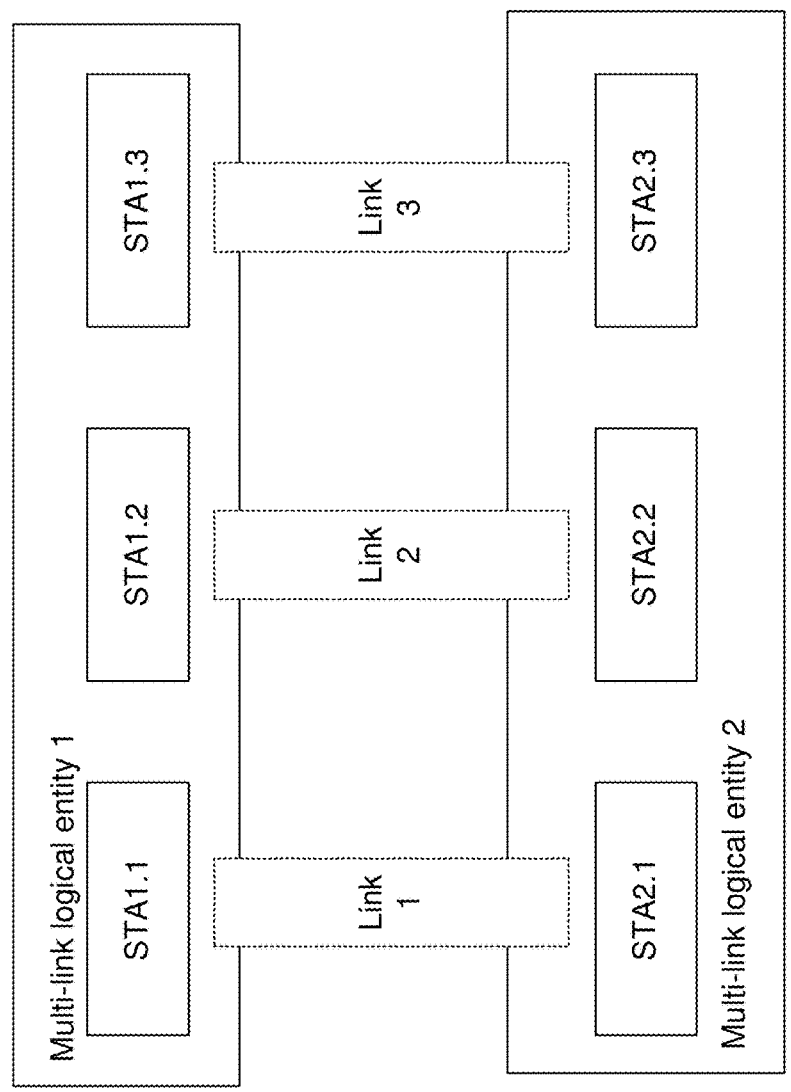
FIG. 1B depicts an illustrative schematic diagram for a multi-link device (MLD) between two logical entities, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

In the current 802.11 baseline standard, the power management (PM) bit in the Frame Control field indicates the transition between the two power management modes: Active mode and Power Save mode. The end of service period (EOSP) bit of the QOS field is used to indicate the end of the unscheduled automatic power save delivery (U-APSD) service period. The PM bit is located in a medium access control (MAC) header in the Frame Control Field of a frame.

In IEEE 802.11 Working Group, 802.11be is defining a multiple-link operation and the PM bit, trigger frame, and the EOSP bit defined in the 802.11 baseline standard need to be enhanced to support the multi-link operation.

One straightforward approach to this problem is to use the PM bit to indicate the power management modes of all the multiple links to be same, i.e. when the PM bit is set to 1 and successfully exchanged between the access point (AP) and the station device (STA) multi-link logical entities (MLLES), which are referred to throughout this disclosure as multi-link devices (MLDs), all the STAs of the links are in the Power Save mode. Similarly, when the PM bit is set to 0 and the frame is exchanged successfully, all the STAs of the links are in the Active mode. This approach, however, prevents STAs from choosing their own power management mode per link. This same problem applies to the EOSP bit as well. If the EOSP bit is applied to all the STAs with a same value, the service periods of the U-APSD operation on the multiple links always ends at the same time and this can affect the efficiency of the multi-link operation. Likewise, a trigger frame for the U-APSD as similar problem, where either each STA needs to transmit a trigger frame to start the service period for the U-APSD operation or all the STAs on the multiple links use the same start and end of service periods for the U-APSD operation.

Example embodiments of the present disclosure relate to systems, methods, and devices for multi-link power save indication using a link bitmap for 802.11be (referred as "11be" or "extreme high throughput (EHT)").

In one or more embodiments, a multi-link power save indication system may call a trigger frame to come from a non-AP STA such that once the AP receives this trigger frame non-AP MLD, the AP will treat that non-AP MLD to be in an awake state and can now transmit buffered data frames to that non-AP MLD.

Traditionally, only one link exists between two devices (e.g., an AP and an STA). All the packets exchanged between these two devices go through that link. Hence, there was no need to consider multiple links that could simultaneously transmit data between the two devices. However, in 11be, there are multiple links between devices. In each of the MLDs (e.g., AP MLD or non-AP MLD), each entity (e.g., APs in the AP MLD and the STAs in the non-AP MLD) can each have their own power state independent of each other within each MLD. Therefore, each AP in the AP MLD can be either in the awake or doze state. The same is true for each STA in the non-AP MLD.

In one or more embodiments, a multi-link power save indication system may an STA can indicate its power state on each link, the STA can do the traditional power save indication by transmitting a trigger frame from each STA with the non-AP MLD to notify the corresponding AP in the AP MLD that the STA is in awake/doze state. Or the AP may indicate the the corresponding STA by setting the EOSP bit to 1 or more data (MD) bit to 0 to indicate that the STA can go back to the doze state since the EOSP bit is 1 (meaning end of service period has been reached) and the more data bit is 0 (meaning there is no more data for that STA).

There are two power mode modes of operation, 1) active mode and 2) power management mode. In the active mode, the device is always in the awake state. However, in the power management mode, the device can be in the awake state or in the doze state. The device can switch between the active mode and the power management mode. Once the device is in the power management mode, the device can have a power state either awake state (active, power on) or doze state (asleep, power off).

In one or more embodiments, a multi-link power save indication system may define a link bitmap in a frame that is exchanged between the AP and STA MLDs so that the link bitmap can indicate the links to which the PM bit, trigger frame, and the EOSP bit apply and thereby extending the PM bit, trigger frame, and the EOSP bit to multiple links scenario of the MLD. Each link is assigned with an ID called link ID (LID). The PM bit, trigger frame, and the EOSP bit have effect for the links indicated in the link bitmap (e.g., when the bit positions of the bitmap that are associated with the links are set to 1).

In one or more embodiments, a multi-link power save indication system may enable a single frame exchange to make changes to the power management modes on the multiple links between AP and STA MLDs and thereby improving the efficiency for the multi-link power save operation. Without the multi-link power save indication system, each STA has to transmit a frame with the PM bit set to 1 or 0 to change the power management mode of the link.

In one or more embodiments, the multi-link power save indication system allows different links to have different end of service periods when operating under U-APSD mode and thus enables more efficient power save operation. Without the multi-link power save indication system, the end of service periods of all the links have to be the same even if there is no data to transmit on one or more links.

In one or more embodiments, the multi-link power save indication system also allows a trigger frame for the U-APSD to start the service period on any link(s) and thereby improving the efficiency for the multi-link power save operation.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1A is a network diagram illustrating an example network environment of multi-link power save indication, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 9:
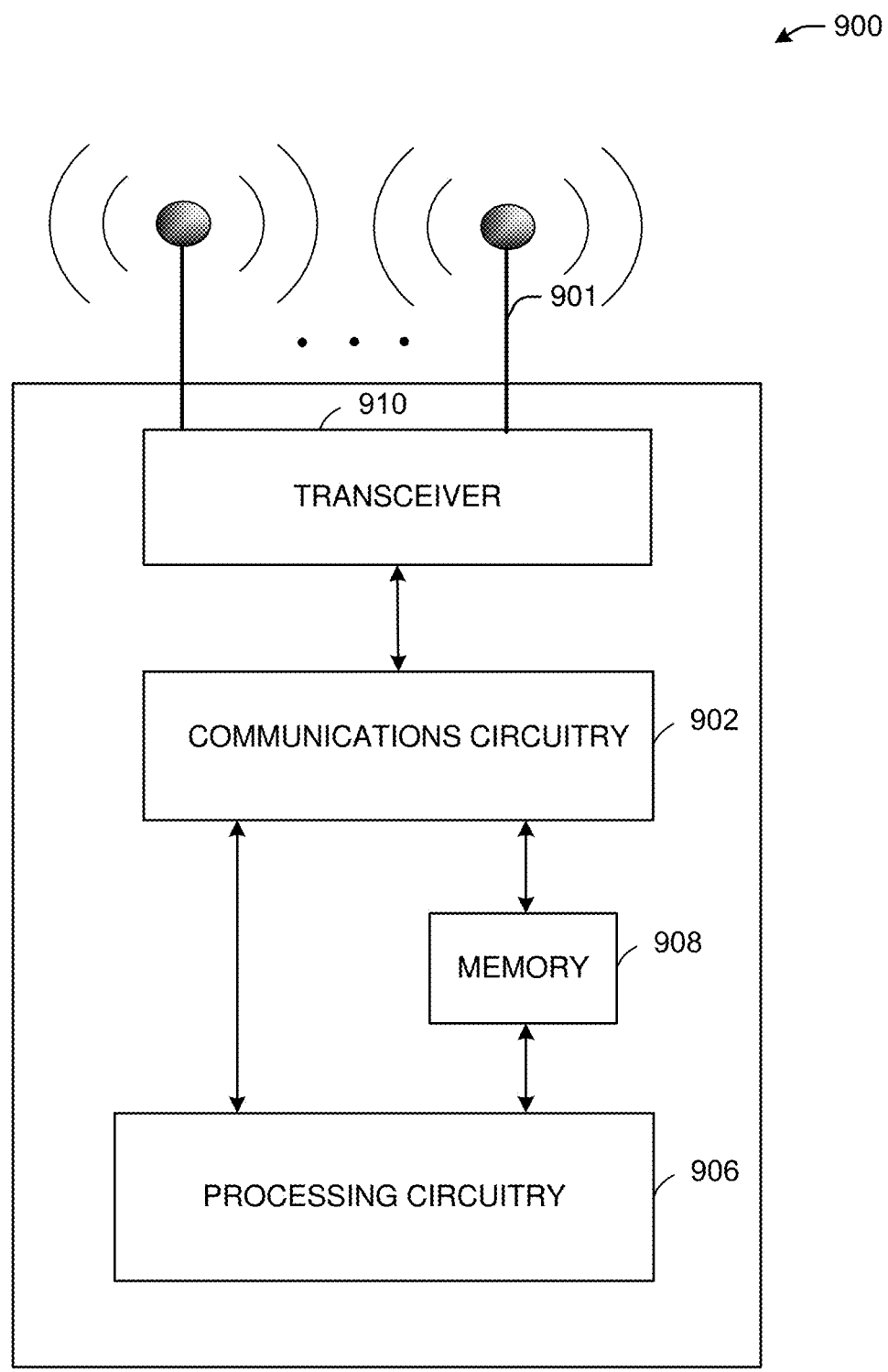
FIG. 9 illustrates a functional diagram of an exemplary communication station that may be suitable for use as a user device, in accordance with one or more example embodiments of the present disclosure.
Figure 10:
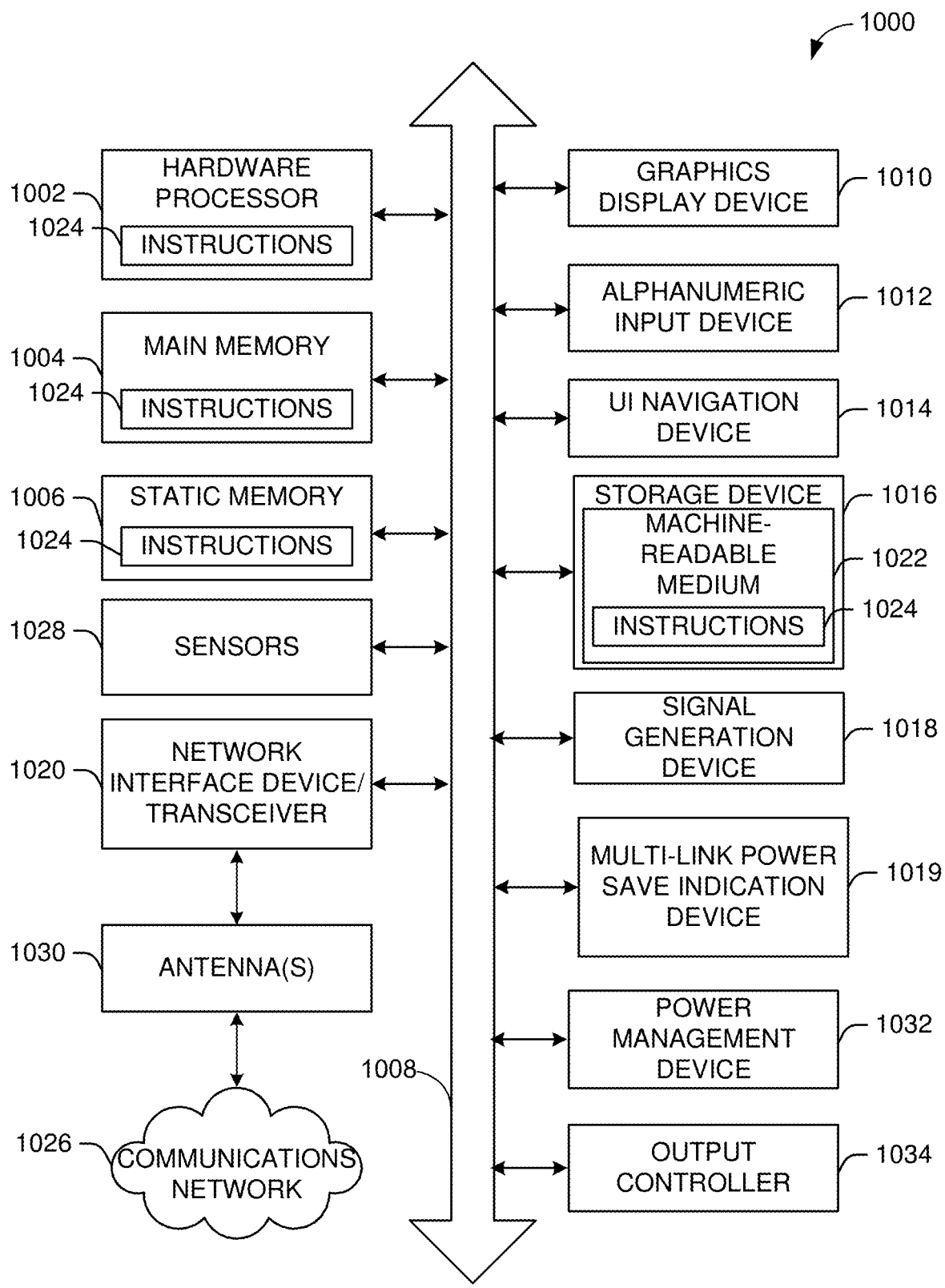
FIG. 10 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 9 and/or the example machine/system of FIG. 10.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHZ channels (e.g., 802.11ad, 802.11ay). 800 MHz channels (e.g., 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, AP 102 may facilitate multi-link power save indication 142 with one or more user devices 120.

It is understood that the above descriptions are for purposes of illustration and are not meant to be limiting.

FIG. 1B depicts an illustrative schematic diagram for a multi-link device (MLD) between two logical entities, in accordance with one or more example embodiments of the present disclosure.

Referring to FIG. 1B, there are shown two multi-link logical entities 150 on either side which includes multiple STAs that can set up links with each other. A multi-link logical entity may be a logical entity that contains one or more STAs. The logical entity has one MAC data service interface and primitives to the logical link control (LLC) and a single address associated with the interface, which can be used to communicate on the distribution system medium (DSM). It should be noted that a Multi-link logical entity allows STAs within the multi-link logical entity to have the same MAC address. It should also be noted that the exact name can be changed.

In this example of FIG. 1B, the multi-link logical entity 1 and multi-link logical entity 2 may be two separate physical devices, where each one comprises a number of virtual or logical devices. For example, multi-link logical entity 1 may comprise three STAs, STA1.1, STA1.2, and STA1.3 and multi-link logical entity 2 that may comprise three STAs, STA2.1, STA2.2, and STA2.3. The example shows that logical device STA1.1 is communicating with logical device STA2.1 over link 1, that logical device STA1.2 is communicating with logical device STA2.2 over link 2, and that device STA1.3 is communicating with logical device STA2.3 over link 3.

Figure 1C:
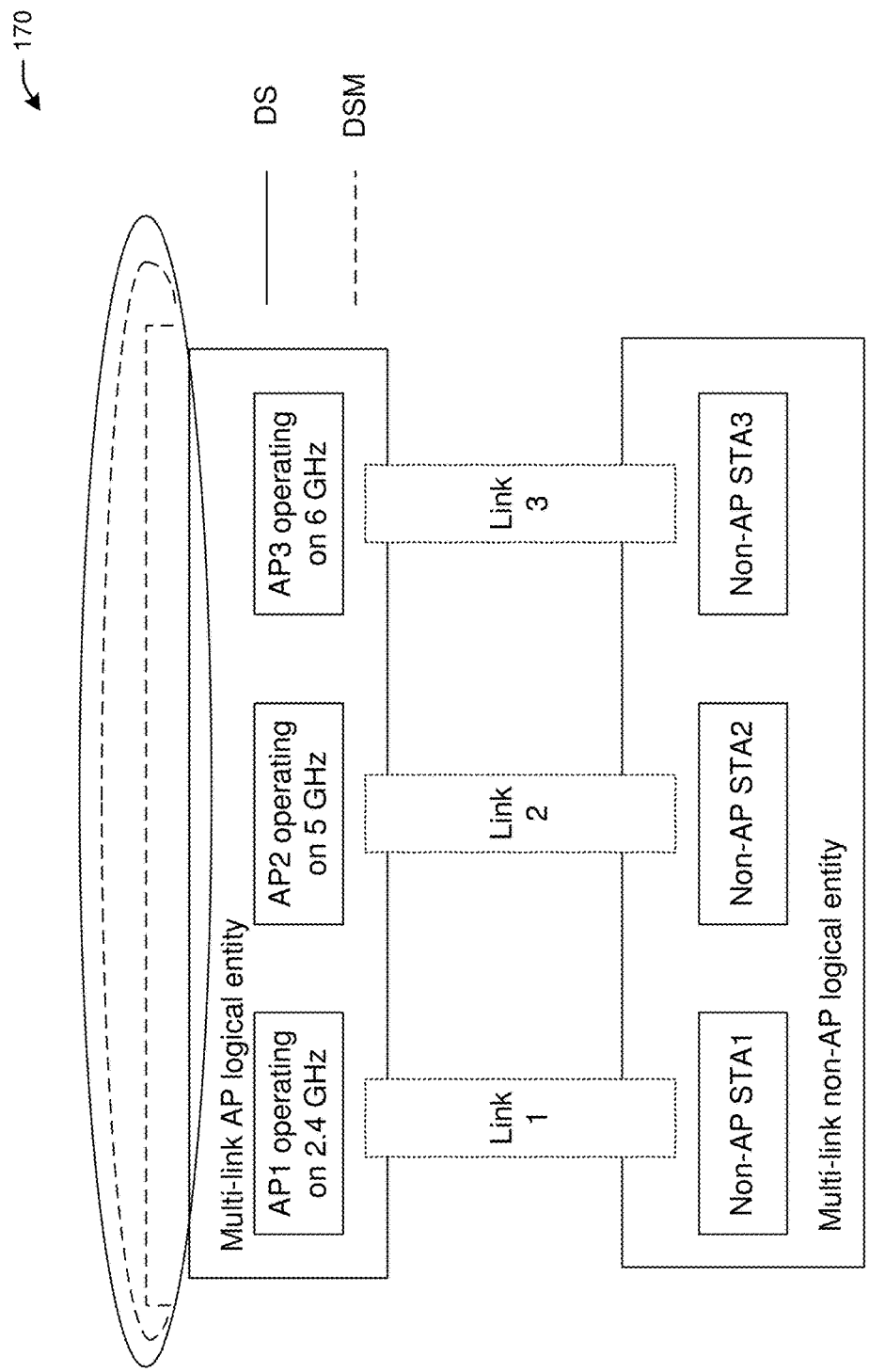
FIG. 1C depicts an illustrative schematic diagram for a multi-link device (MLD) between AP with logical entities and a non-AP with logical entities, in accordance with one or more example embodiments of the present disclosure.

FIG. 1C depicts an illustrative schematic diagram 170 for a multi-link device (MLD) between AP with logical entities and a non-AP with logical entities, in accordance with one or more example embodiments of the present disclosure.

Referring to FIG. 1C, there are shown two multi-link logical entities on either side which includes multiple STAs that can set up links with each other. For infrastructure framework, a multi-link AP logical entity may include APs (e.g., AP1, AP2, and AP3) on one side, and multi-link non-AP logical entity, which may include non-APs (STA1, STA2, and STA3) on the other side. The detailed definition is shown below. Multi-link AP logical entity (AP MLLE also can be referred to as AP MLD): A multi-link logical entity, where each STA within the multi-link logical entity is an EHT AP. It should be noted that the term MLLE and MLD are interchangeable and indicate the same type of entity. Throughout this disclosure, MLLE may be used but anywhere the MLLE term is used, it can be replaced with MLD. Multi-link non-AP logical entity (non-AP MLLE, also can be referred to as non-AP MLD): A multi-link logical entity, where each STA within the multi-link logical entity is a non-AP EHT STA. it should be noted that this framework is a natural extension from the one link operation between two STAs, which are AP and non-AP STA under the infrastructure framework (e.g., when an AP is used as a medium for communication between STAs).

In the example of FIG. 1C, the multi-link AP logical entity and multi-link non-AP logical entity may be two separate physical devices, where each one comprises a number of virtual or logical devices. For example, the multi-link AP logical entity may comprise three APs, AP1 operating on 2.4 GHz, AP2 operating on 5 GHz, and AP3 operating on 6 GHz. Further, the multi-link non-AP logical entity may comprise three non-AP STAs, STA1 communicating with AP1 on link 1, STA2 communicating with AP2 on link 2, and STA3 communicating with AP3 on link 3.

The multi-link AP logical entity is shown in FIG. 1C to have access to a distribution system (DS), which is a system used to interconnect a set of BSSs to create an extended service set (ESS). The multi-link AP logical entity is also shown in FIG. 1C to have access a distribution system medium (DSM), which is the medium used by a DS for BSS interconnections. Simply put, DS and DSM allow the AP to communicate with different BSSs.

It should be understood that although the example shows three logical entities within the multi-link AP logical entity and the three logical entities within the multi-link non-AP logical entity, this is merely for illustration purposes and that other numbers of logical entities with each of the multi-link AP and non-AP logical entities may be envisioned.

FIG. 2 depicts an illustrative schematic diagram 200 for a multi-link power save control subfield, in accordance with one or more example embodiments of the present disclosure.

In one or more embodiments, a multi-link power save indication system may facilitate the definition of Multi-link Power Save Control subfield in the A-Control field of a data frame.

In one or more embodiments, a multi-link power save indication system may define a new Control subfield named "Multi-link Power Save Control" subfield as shown in FIG. 2. It should be understood that the size of each subfield may change or may be different.

The Control ID field is set to one of the reserved values (e.g., 7) to indicate the MLPS Control subfield.

The Link Bitmap Size field indicates the size of the Link Bitmap field. The field is 2-bit long. The encoding of the Link Bitmap Size field is as follows:

Value 0: the Link Bitmap field is 2-bit long.
Value 1: the Link Bitmap field is 4-bit long.
Value 2: the Link Bitmap field is 8-bit long.
Value 3: the Link Bitmap field is 16-bit long.

The Link Bitmap field indicates the bitmap of the link identifiers. Each link between the AP and STA MLDs is assigned with a link ID and each bit position of the bitmap corresponds to the link ID. When a bit position n is set to 1, the PM bit, trigger frame, or the EOSP bit applies to the link that is assigned with the link ID=n. When a bit position n is set to 0, the PM bit, trigger frame, nor the EOSP bit does apply to the link with the link ID=n. For example, if a bitmap bit associated with STA 1 of an non-AP MLD is set to 1, this indicates that whatever the PM bit, for example, is set to applies to STA 1. That is, the bit link bitmap field is used to indicate which link(s) the PM bit applies to. The same applies to the trigger frame and the EOSP bit. The link bitmap field is include in a MAC header of a frame but in a different field of the PM bit.

The rest of the bits in the Control subfield is reserved.

Figure 3:
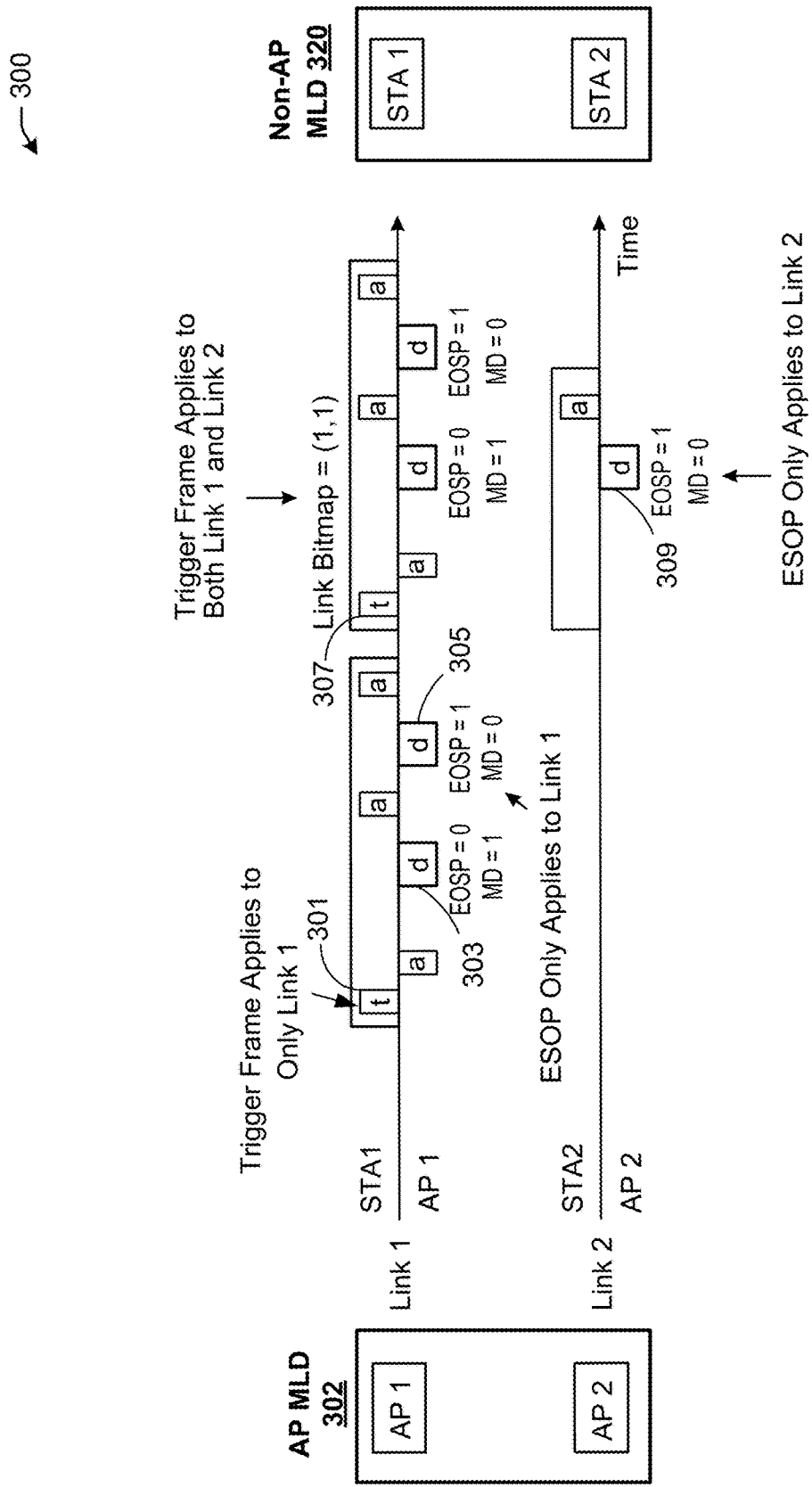
FIG. 3 depicts an illustrative schematic diagram for multi-link power save indication, in accordance with one or more example embodiments of the present disclosure.

FIG. 3 depicts an illustrative schematic diagram 300 for multi-link power save indication, in accordance with one or more example embodiments of the present disclosure.

Referring to FIG. 3, there is shown a multi-link U-APSD operation using the link bitmap field. In FIG. 3, an AP MLD 302 comprising two APs (AP 1 and AP 2) is communicating with a non-AP MLD 320, which comprises STA 1 and STA 2. It should be understood that although two links are shown between the APs and the STAs any number of links may be determined based on the number of logical devices within each of the MLDs. In this example, link 1 is shown to be used between STA 1 and AP 1 and link 2 is shown to be used between STA 2 and AP 2.

This example in FIG. 3 shows the multi-link U-APSD operation and assumes that both STAs are in the PS mode.

The non-AP MLD 320 uses only Link 1 to receive data from the AP MLD 302. Therefore, STA1 transmits a U-APSD trigger frame 301 on Link 1. The trigger frame "t" does not include the Link Bitmap field (i.e. does not contain the MLPS Control subfield) and therefore follows the existing U-APSD operation.

As seen in FIG. 3, the first data frame 303 transmitted by AP 1 includes the EOSP set to 0, indicating that this is not the end of service period and the more data (MD) bit set to 1 indicating that there are more data buffered at the AP1. The second data frame 305 includes the EOSP set to 1, indicating that the service period ends after this data frame on Link 1 and the MD bit is set to 0 indicating that there is no more data at the AP1. It should be understood that receiving a trigger frame indicates to the AP MLD that the non-AP MLD has some links that are in the awake state.

In this example, STA1 transmits another trigger frame 307 and this time the Link Bitmap subfield of the MLPS Control subfield is set to (1,1) indicating that this trigger frame and the PM bit apply to both Link 1 and Link 2 and both links are in the awake state. The third data frame transmitted by the AP1 includes the EOSP set to 0, indicating that the service period has not ended and this only applies to Link 1 following the existing U-APSD operation. The first data frame 309 transmitted by AP 2 includes the EOSP bit set to 1, indicating that the EOSP bit applies to Link 2 and the service period ends after the data frame. Here, there is no link bitmap field and therefore since the data frame comprising the EOSP being set to 1 and the MD is set to 0, while the data frame is sent on Link 2, this applies only to Link 2.

Figure 4:
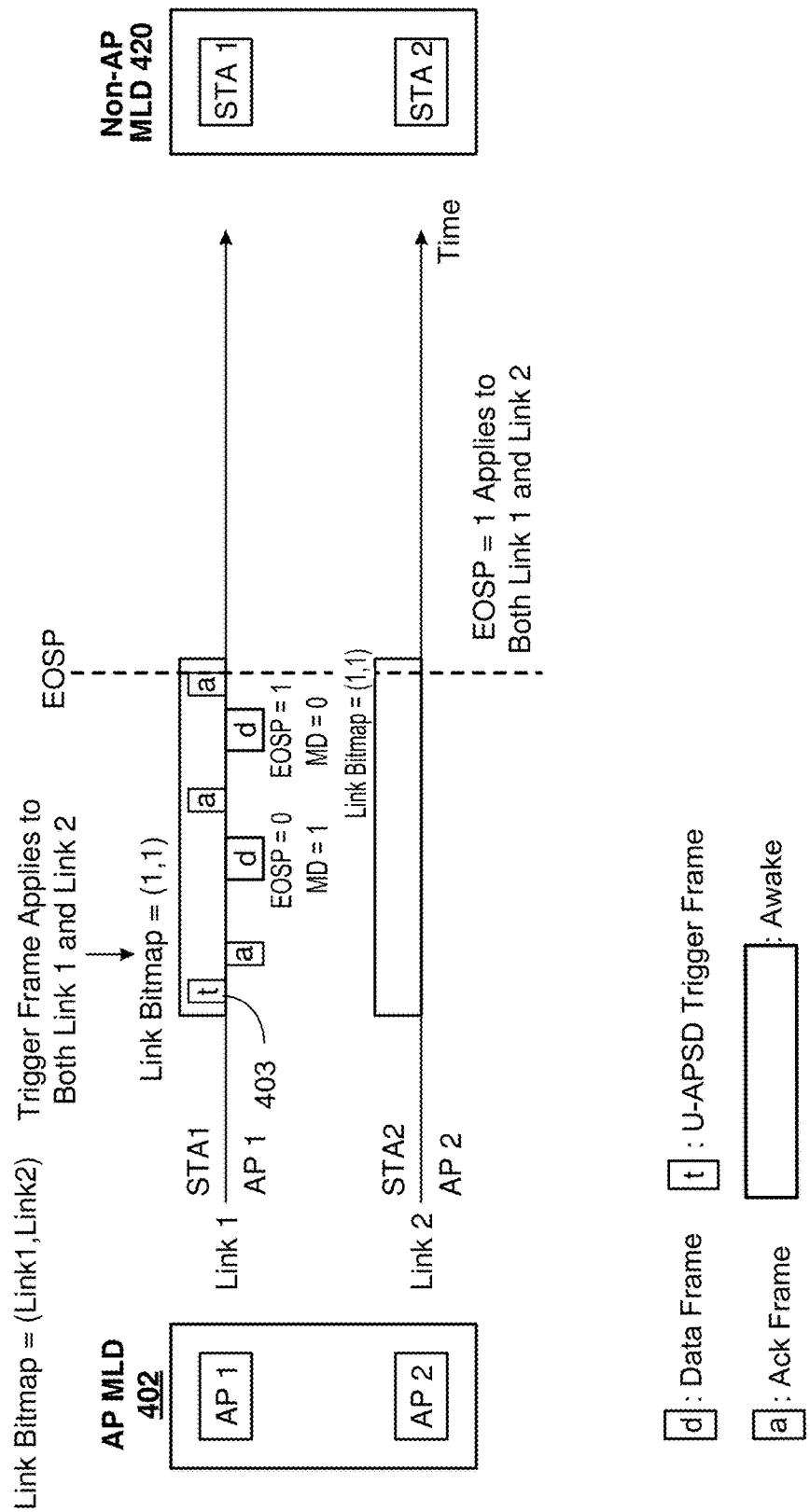
FIG. 4 depicts an illustrative schematic diagram for multi-link power save indication, in accordance with one or more example embodiments of the present disclosure.

FIG. 4 depicts an illustrative schematic diagram 400 for multi-link power save indication, in accordance with one or more example embodiments of the present disclosure.

Referring to FIG. 4, there is shown a multi-link U-APSD operation—indicating EOSP for multiple links.

The example in FIG. 4 shows the multi-link power save operation using the U-APSD where the power state of the two STAs in the non-AP MLD 420 are changed to awake state by a trigger frame transmitted by STA 1 and the end of service period the multiple links are indicated in one data frame on one of the links.

STA 1 transmits a trigger frame 403 with the Link Bitmap set to (1,1), indicating that the trigger frame applies to both links, and thus by sending this trigger frame 403, this indicates that both STA 1 and STA 2 are in an awake state after the transmission of the trigger frame 403. AP 1 of AP MLD 402 transmits a first data frame with the EOSP set to 0, indicating that the service period has not ended for Link 1, and with the MD bit set to 1, indicating that there are more buffered data. Still there is no data frame transmitted on Link 2. AP 1 transmits a second data frame with the Link Bitmap set to (1,1) and EOSP set to 1, indicating that the service period will end after the second data frame for both Link 1 and Link 2. The MD bit is set to 0, but this indicates that there is no more data on AP 1. After the end of the service period, STA 1 and STA 2 may return to doze state.

Figure 5:
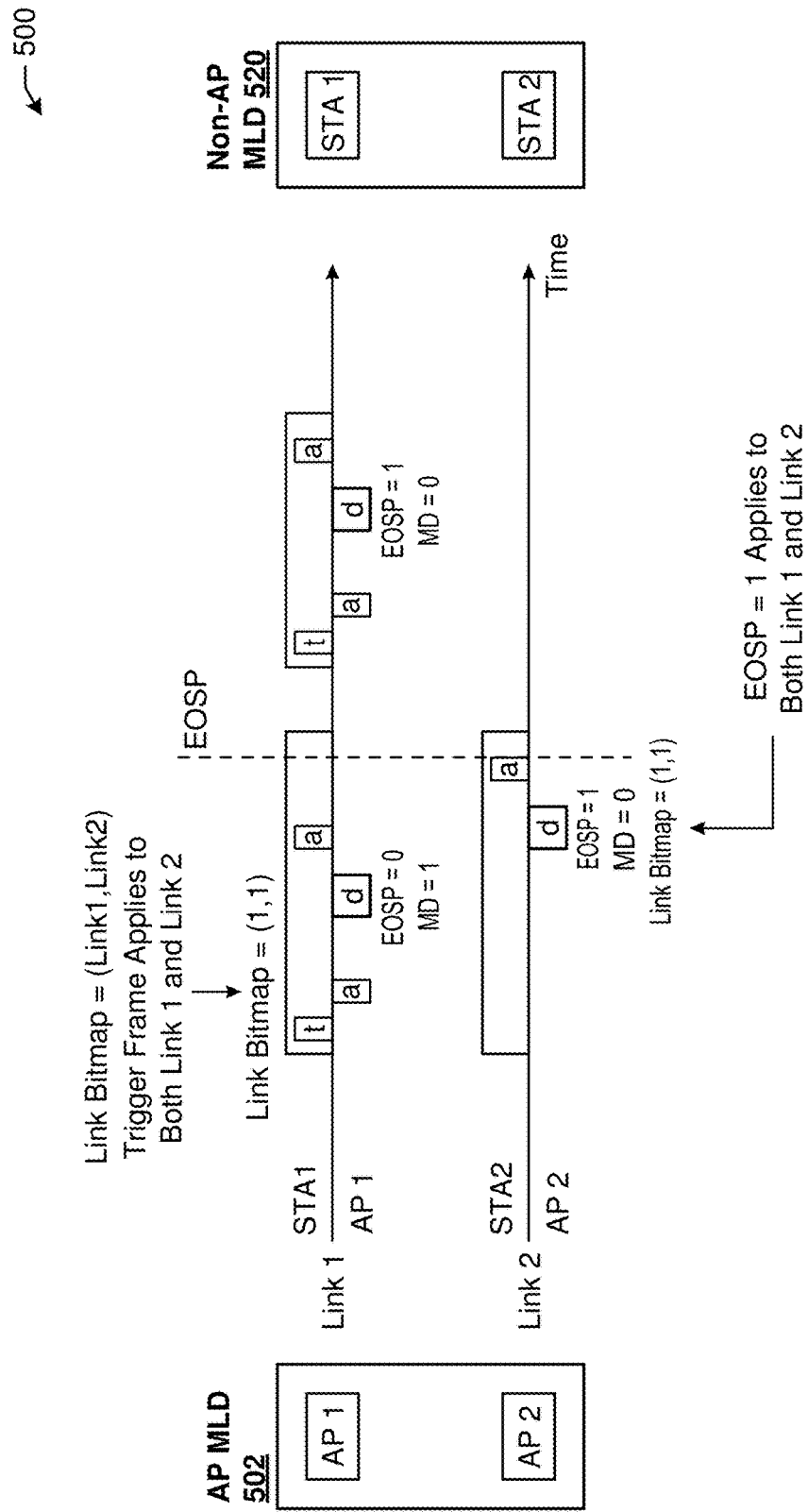
FIG. 5 depicts an illustrative schematic diagram for multi-link power save indication, in accordance with one or more example embodiments of the present disclosure.

FIG. 5 depicts an illustrative schematic diagram for multi-link power save indication, in accordance with one or more example embodiments of the present disclosure.

Referring to FIG. 5, there is shown a multi-link U-APSD operation—indicating EOSP and MD for multiple links.

The example in FIG. 5 shows when the EOSP for both links are indicated by the data frame transmitted to non-AP MLD 520 on Link 2 and the MD bit of the data frame in Link 1 indicates the buffered data at AP1 of AP MLD 502 and the MD bit of the data frame in Link 2 indicates the buffered data at AP2. The link bitmap included in the trigger frame is shown to be (1,1), indicating that the trigger frame applies to both link 1 and link 2. The data frame sent by AP1 has EOSP set to 0 and MD set 1. Also on Link 2, the AP 2 set the EOSP to 1 and the MD to 0, with a link bitmap of (1,1), indicating that the EOSP applies to both link 1 and link 2.

It is understood that the above descriptions are for purposes of illustration and are not meant to be limiting.

Figure 6:
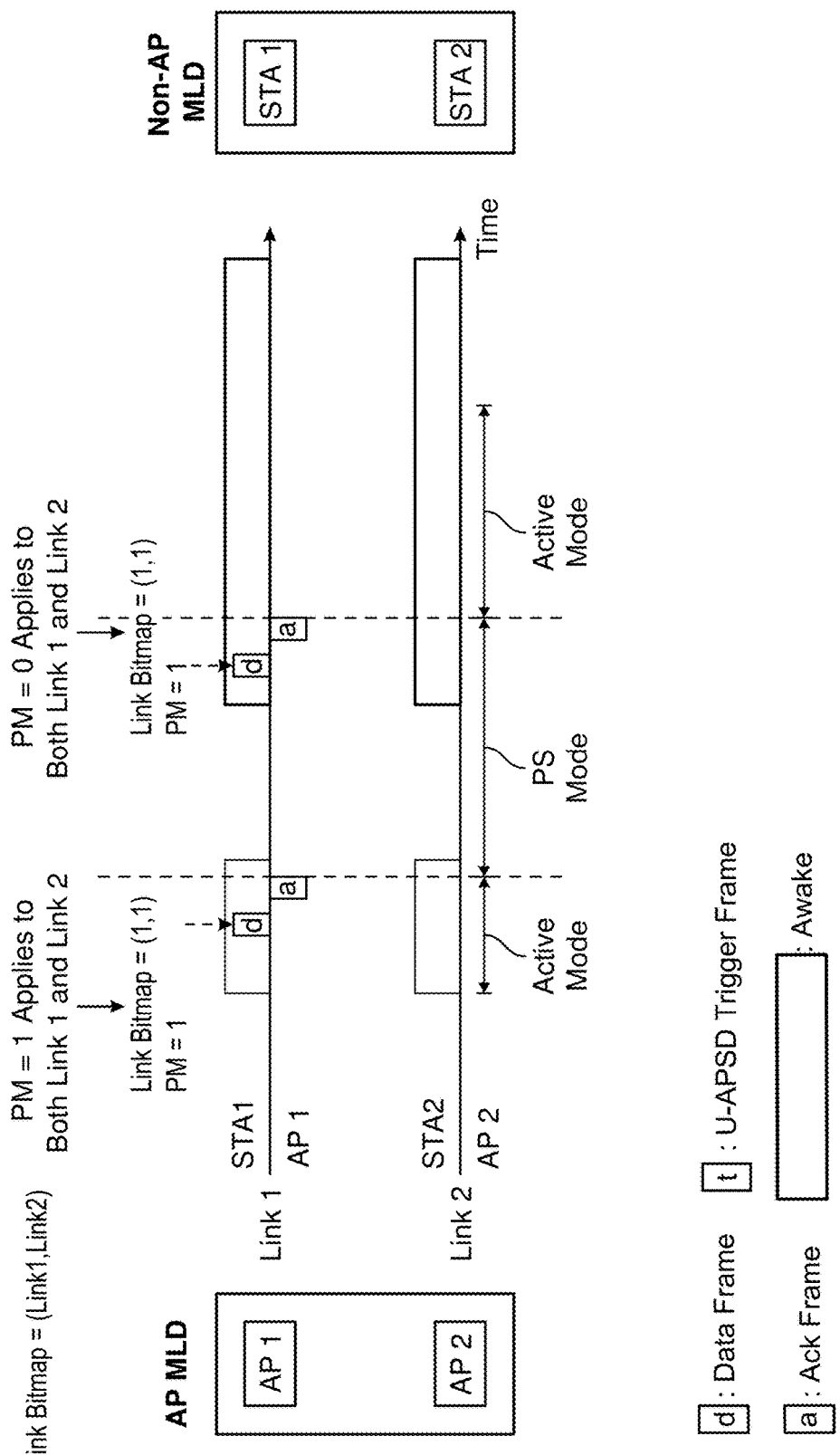
FIG. 6 depicts an illustrative schematic diagram for multi-link power save indication, in accordance with one or more example embodiments of the present disclosure.

FIG. 6 depicts an illustrative schematic diagram 600 for multi-link power save indication, in accordance with one or more example embodiments of the present disclosure.

Referring to FIG. 6, there is shown a power management mode transition for multiple links using the link bitmap.

The example in FIG. 6 shows the multi-link power save operation where two links are initially in Active mode and changing the power management mode of both STAs with a single frame exchange.

STA1 transmits a frame with the Link Bitmap set to (1,1) and the PM bit set to 1, indicating that the PM bit applies to both Link 1 and Link 2 and after the frame exchange, STA1 and STA2 enters PS mode.

STA1 transmits another frame with the Link Bitmap set to (1,1) and the PM bit set to 0, indicating that the PM bit applies to both Link 1 and Link 2 and after the frame exchange, STA1 and STA2 are in Active mode.

It is understood that the above descriptions are for purposes of illustration and are not meant to be limiting.

Figure 7:
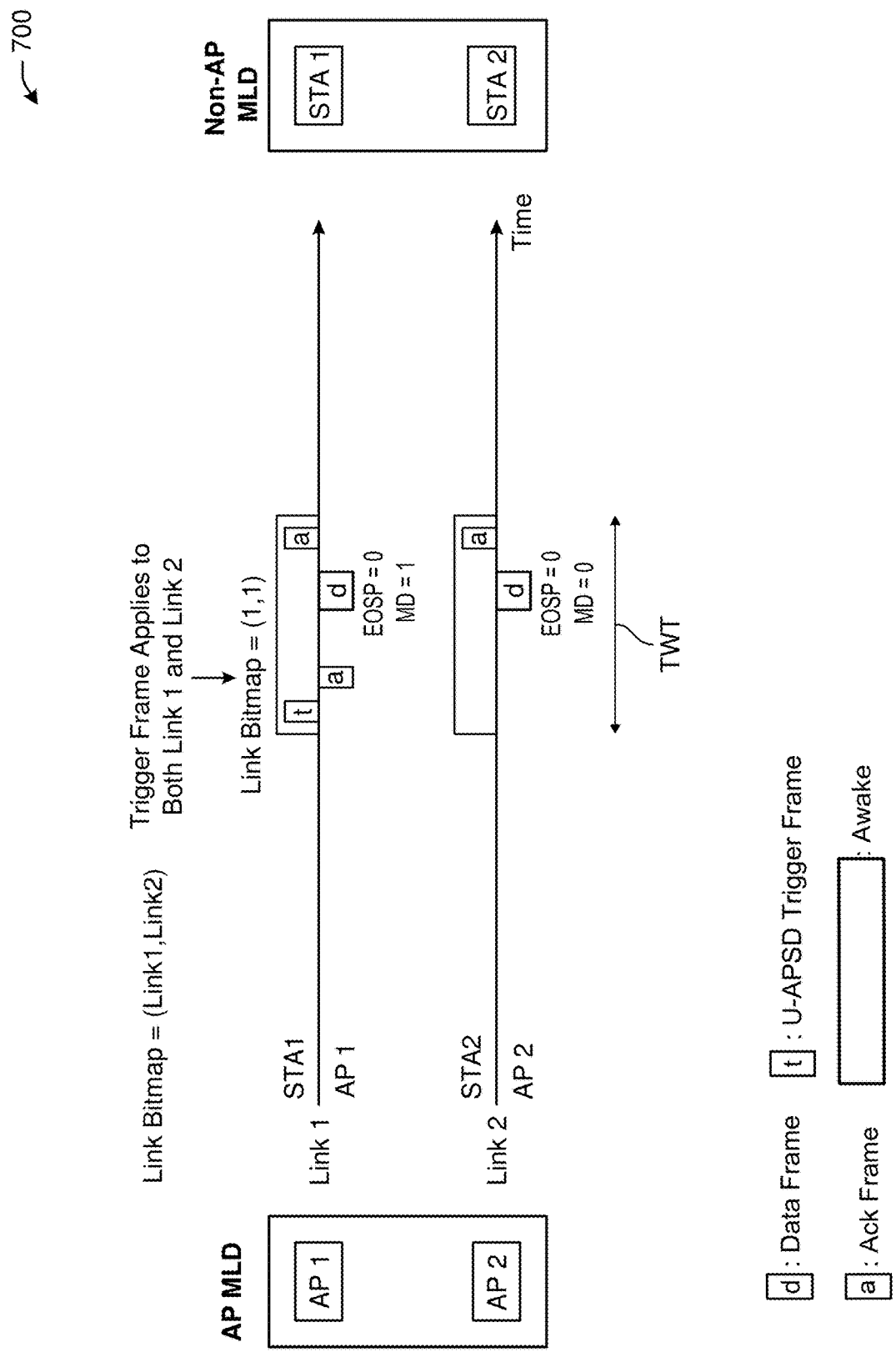
FIG. 7 depicts an illustrative schematic diagram for multi-link power save indication, in accordance with one or more example embodiments of the present disclosure.

FIG. 7 depicts an illustrative schematic diagram for multi-link power save indication, in accordance with one or more example embodiments of the present disclosure.

Referring to FIG. 7, there is shown announced TWT for multiple links using the link bitmap.

The example in FIG. 7 shows the announced TWT operation 700 for multiple links using the link bitmap where the TWT SPs for the multiple links are scheduled in a synchronous way.

STA1 transmits a trigger frame at the beginning of the TWT SP with the link bitmap set to (1,1) indicating that the trigger frame applies to both Link 1 and Link 2. AP1 and AP2 transmits their data frame on Link1 and Link2 without the link bitmap. In this example, Link 1 and Link 2 may terminate the SP separately. In this example, the STA 2 does not need to send a trigger frame to indicate that it is awake because this has been covered by the trigger frame sent by STA 1 to AP 1 and having the link bitmap set to (1, 1). This way, the AP 2 sends case data frame to the STA 2.

It is understood that the above descriptions are for purposes of illustration and are not meant to be limiting.

Figure 8:
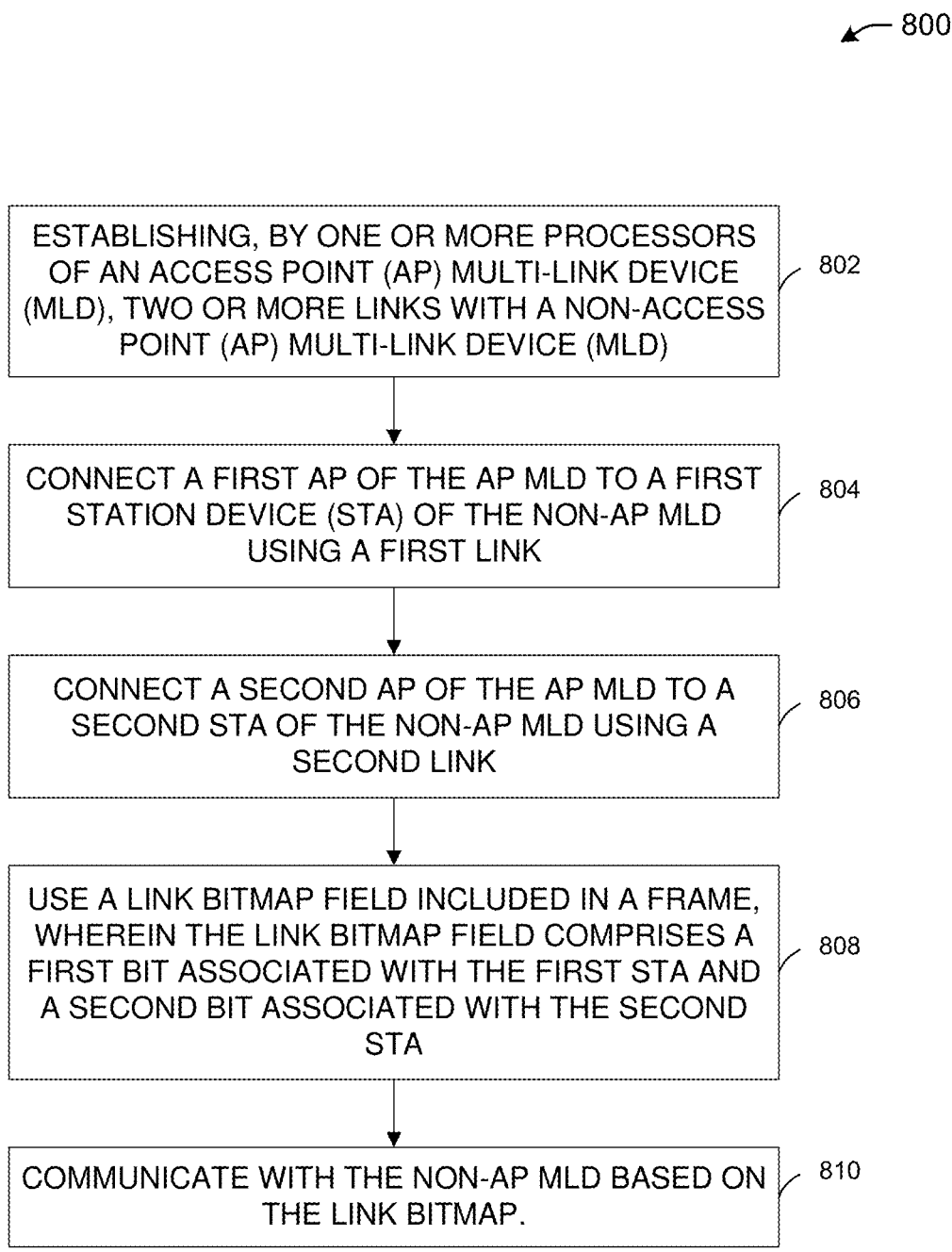
FIG. 8 illustrates a flow diagram of illustrative process for an illustrative multi-link power save indication system, in accordance with one or more example embodiments of the present disclosure.

FIG. 8 illustrates a flow diagram of illustrative process 800 for a multi-link power save indication system, in accordance with one or more example embodiments of the present disclosure.

At block 802, a device (e.g., the user device(s) 120 and/or the AP 102 of FIG. 1A) may establish two or more links with a non-access point (AP) multi-link device (MLD).

At block 804, the device may connect a first AP of the AP MLD to a first station device (STA) of the non-AP MLD using a first link.

At block 806, the device may connect a second AP of the AP MLD to a second STA of the non-AP MLD using a second link.

At block 808, the device may use a link bitmap field included in a frame, wherein the link bitmap field comprises a first bit associated with the first STA and a second bit associated with the second STA. The link bitmap size indicates a size of the link bitmap field. The link bitmap size equal to 0 indicates that the link bitmap field is 2-bit long, wherein the link bitmap size equal to 1 indicates that the link bitmap field is 4-bit long, wherein the link bitmap size equal to 2 indicates that the link bitmap field is 8-bit long, and wherein the link bitmap size equal to 3 indicates that the link bitmap field is 16-bit long. The first bit of the link bitmap field being set to 1 indicates that the first STA is in a awake state, and wherein the first bit of the link bitmap field being set to 0 indicates that the first STA is in a doze state.

At block 810, the device may communicate with the non-AP MLD based on the link bitmap. To communicate with the non-AP MLD comprises sending data on a link of the two or more links based on a corresponding bit of the link bitmap field being set to 1. The device may identify a trigger frame received on a link of the two or more links from the non-AP MLD, wherein the trigger frame does not include the link bitmap field; and communicate with the non-AP MLD on the link of the two or more links. The device may generate a data frame to be sent to the non-AP MLD on the first link; set an end of a service period (EOSP) field of the data frame to be equal to 0 or 1 indicating a status of the service period; set a more data field to 0 or 1 indicating whether there are more data frames to be sent to the non-AP MLD; include a first link bitmap field in the data frame; and communicate with the non-AP MLD on the first link or the second link based on a first link bitmap field included in the data frame.

It is understood that the above descriptions are for purposes of illustration and are not meant to be limiting.

FIG. 9 shows a functional diagram of an exemplary communication station 900, in accordance with one or more example embodiments of the present disclosure. In one embodiment, FIG. 9 illustrates a functional block diagram of a communication station that may be suitable for use as an AP 102 (FIG. 1A) or a user device 120 (FIG. 1A) in accordance with some embodiments. The communication station 900 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 900 may include communications circuitry 902 and a transceiver 910 for transmitting and receiving signals to and from other communication stations using one or more antennas 901. The communications circuitry 902 may include circuitry that can operate the physical layer (PHY) communications and/or medium access control (MAC) communications for controlling access to the wireless medium, and/or any other communications layers for transmitting and receiving signals. The communication station 900 may also include processing circuitry 906 and memory 908 arranged to perform the operations described herein. In some embodiments, the communications circuitry 902 and the processing circuitry 906 may be configured to perform operations detailed in the above figures, diagrams, and flows.

In accordance with some embodiments, the communications circuitry 902 may be arranged to contend for a wireless medium and configure frames or packets for communicating over the wireless medium. The communications circuitry 902 may be arranged to transmit and receive signals. The communications circuitry 902 may also include circuitry for modulation/demodulation, upconversion/downconversion, filtering, amplification, etc. In some embodiments, the processing circuitry 906 of the communication station 900 may include one or more processors. In other embodiments, two or more antennas 901 may be coupled to the communications circuitry 902 arranged for sending and receiving signals. The memory 908 may store information for configuring the processing circuitry 906 to perform operations for configuring and transmitting message frames and performing the various operations described herein. The memory 908 may include any type of memory, including non-transitory memory, for storing information in a form readable by a machine (e.g., a computer). For example, the memory 908 may include a computer-readable storage device, read-only memory (ROM), random-access memory (RAM), magnetic disk storage media, optical storage media, flash-memory devices and other storage devices and media.

In some embodiments, the communication station 900 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 900 may include one or more antennas 901. The antennas 901 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 900 may include one or more of a keyboard, a display, a non-volatile memory port, multiple antennas, a graphics processor, an application processor, speakers, and other mobile device elements. The display may be an LCD screen including a touch screen.

Although the communication station 900 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 900 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 900 may include one or more processors and may be configured with instructions stored on a computer-readable storage device.

FIG. 10 illustrates a block diagram of an example of a machine 1000 or system upon which any one or more of the techniques (e.g., methodologies) discussed herein may be performed. In other embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environments. The machine 1000 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a power management device 1032, a graphics display device 1010, an alphanumeric input device 1012 (e.g., a keyboard), and a user interface (UI) navigation device 1014 (e.g., a mouse). In an example, the graphics display device 1010, alphanumeric input device 1012, and UI navigation device 1014 may be a touch screen display. The machine 1000 may additionally include a storage device (i.e., drive unit) 1016, a signal generation device 1018 (e.g., a speaker), a multi-link power save indication device 1019, a network interface device/transceiver 1020 coupled to antenna(s) 1030, and one or more sensors 1028, such as a global positioning system (GPS) sensor, a compass, an accelerometer, or other sensor. The machine 1000 may include an output controller 1034, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 1002 for generation and processing of the baseband signals and for controlling operations of the main memory 1004, the storage device 1016, and/or the multi-link power save indication device 1019. The baseband processor may be provided on a single radio card, a single chip, or an integrated circuit (IC).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within the static memory 1006, or within the hardware processor 1002 during execution thereof by the machine 1000. In an example, one or any combination of the hardware processor 1002, the main memory 1004, the static memory 1006, or the storage device 1016 may constitute machine-readable media.

The multi-link power save indication device 1019 may carry out or perform any of the operations and processes (e.g., process 800) described and shown above.

It is understood that the above are only a subset of what the multi-link power save indication device 1019 may be configured to perform and that other functions included throughout this disclosure may also be performed by the multi-link power save indication device 1019.

While the machine-readable medium 1022 is illustrated as a single medium, the term "machine-readable medium" may include a single medium or multiple media (e.g., a centralized or distributed database, and/or associated caches and servers) configured to store the one or more instructions 1024.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1000 and that cause the machine 1000 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device/transceiver 1020 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1020 may include one or more physical jacks (e.g., Ethernet, coaxial, or phone jacks) or one or more antennas to connect to the communications network 1026. In an example, the network interface device/transceiver 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1000 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 11:
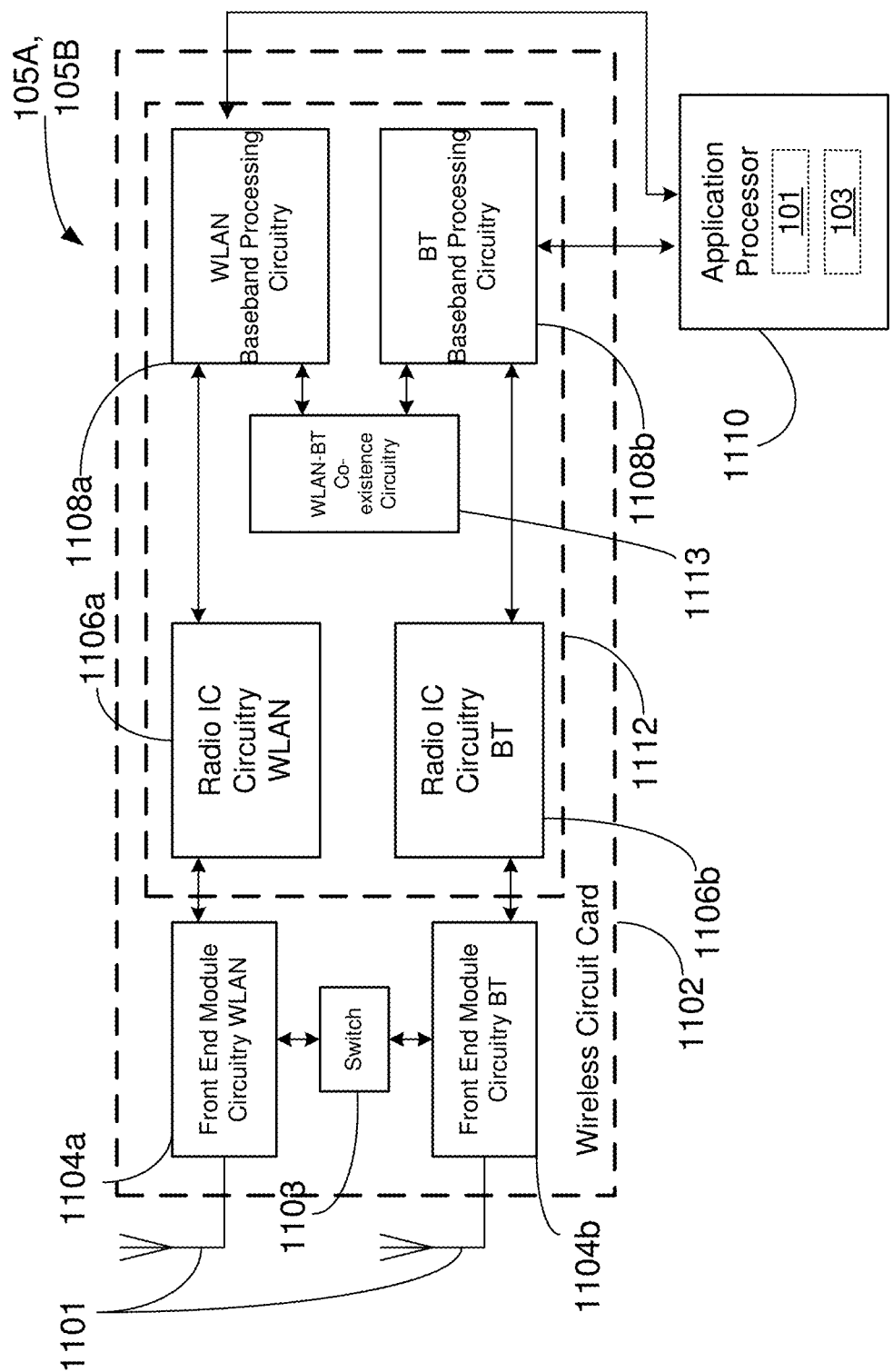
FIG. 11 is a block diagram of a radio architecture in accordance with some examples.

FIG. 11 is a block diagram of a radio architecture 105A, 105B in accordance with some embodiments that may be implemented in any one of the example APs 102 and/or the example STAs 120 of FIG. 1A. Radio architecture 105A, 105B may include radio front-end module (FEM) circuitry 1104a-b, radio IC circuitry 1106a-b and baseband processing circuitry 1108a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1104a-b may include a WLAN or Wi-Fi FEM circuitry 1104a and a Bluetooth (BT) FEM circuitry 1104b. The WLAN FEM circuitry 1104a may include a receive signal path comprising circuitry configured to operate on WLAN RF signals received from one or more antennas 1101, to amplify the received signals and to provide the amplified versions of the received signals to the WLAN radio IC circuitry 1106a for further processing. The BT FEM circuitry 1104b may include a receive signal path which may include circuitry configured to operate on BT RF signals received from one or more antennas 1101, to amplify the received signals and to provide the amplified versions of the received signals to the BT radio IC circuitry 1106b for further processing. FEM circuitry 1104a may also include a transmit signal path which may include circuitry configured to amplify WLAN signals provided by the radio IC circuitry 1106a for wireless transmission by one or more of the antennas 1101. In addition, FEM circuitry 1104b may also include a transmit signal path which may include circuitry configured to amplify BT signals provided by the radio IC circuitry 1106b for wireless transmission by the one or more antennas. In the embodiment of FIG. 11, although FEM 1104a and FEM 1104b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1106a-b as shown may include WLAN radio IC circuitry 1106a and BT radio IC circuitry 1106b. The WLAN radio IC circuitry 1106a may include a receive signal path which may include circuitry to down-convert WLAN RF signals received from the FEM circuitry 1104a and provide baseband signals to WLAN baseband processing circuitry 1108a. BT radio IC circuitry 1106b may in turn include a receive signal path which may include circuitry to down-convert BT RF signals received from the FEM circuitry 1104b and provide baseband signals to BT baseband processing circuitry 1108b. WLAN radio IC circuitry 1106a may also include a transmit signal path which may include circuitry to up-convert WLAN baseband signals provided by the WLAN baseband processing circuitry 1108a and provide WLAN RF output signals to the FEM circuitry 1104a for subsequent wireless transmission by the one or more antennas 1101. BT radio IC circuitry 1106b may also include a transmit signal path which may include circuitry to up-convert BT baseband signals provided by the BT baseband processing circuitry 1108b and provide BT RF output signals to the FEM circuitry 1104b for subsequent wireless transmission by the one or more antennas 1101. In the embodiment of FIG. 11, although radio IC circuitries 1106a and 1106b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 1108a-b may include a WLAN baseband processing circuitry 1108a and a BT baseband processing circuitry 1108b. The WLAN baseband processing circuitry 1108a may include a memory, such as, for example, a set of RAM arrays in a Fast Fourier Transform or Inverse Fast Fourier Transform block (not shown) of the WLAN baseband processing circuitry 1108a. Each of the WLAN baseband circuitry 1108*a* and the BT baseband circuitry 1108*b* may further include one or more processors and control logic to process the signals received from the corresponding WLAN or BT receive signal path of the radio IC circuitry 1106*a-b*, and to also generate corresponding WLAN or BT baseband signals for the transmit signal path of the radio IC circuitry 1106*a-b*. Each of the baseband processing circuitries 1108*a* and 1108*b* may further include physical layer (PHY) and medium access control layer (MAC) circuitry, and may further interface with a device for generation and processing of the baseband signals and for controlling operations of the radio IC circuitry 1106*a-b*.

Referring still to FIG. 11, according to the shown embodiment, WLAN-BT coexistence circuitry 1113 may include logic providing an interface between the WLAN baseband circuitry 1108*a* and the BT baseband circuitry 1108*b* to enable use cases requiring WLAN and BT coexistence. In addition, a switch 1103 may be provided between the WLAN FEM circuitry 1104*a* and the BT FEM circuitry 1104*b* to allow switching between the WLAN and BT radios according to application needs. In addition, although the antennas 1101 are depicted as being respectively connected to the WLAN FEM circuitry 1104*a* and the BT FEM circuitry 1104*b*, embodiments include within their scope the sharing of one or more antennas as between the WLAN and BT FEMs, or the provision of more than one antenna connected to each of FEM 1104*a* or 1104*b*.

In some embodiments, the front-end module circuitry 1104*a-b*, the radio IC circuitry 1106*a-b*, and baseband processing circuitry 1108*a-b* may be provided on a single radio card, such as wireless radio card 1102. In some other embodiments, the one or more antennas 1101, the FEM circuitry 1104*a-b* and the radio IC circuitry 1106*a-b* may be provided on a single radio card. In some other embodiments, the radio IC circuitry 1106*a-b* and the baseband processing circuitry 1108*a-b* may be provided on a single chip or integrated circuit (IC), such as IC 1112.

In some embodiments, the wireless radio card 1102 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11 ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 1108*b* may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 12:
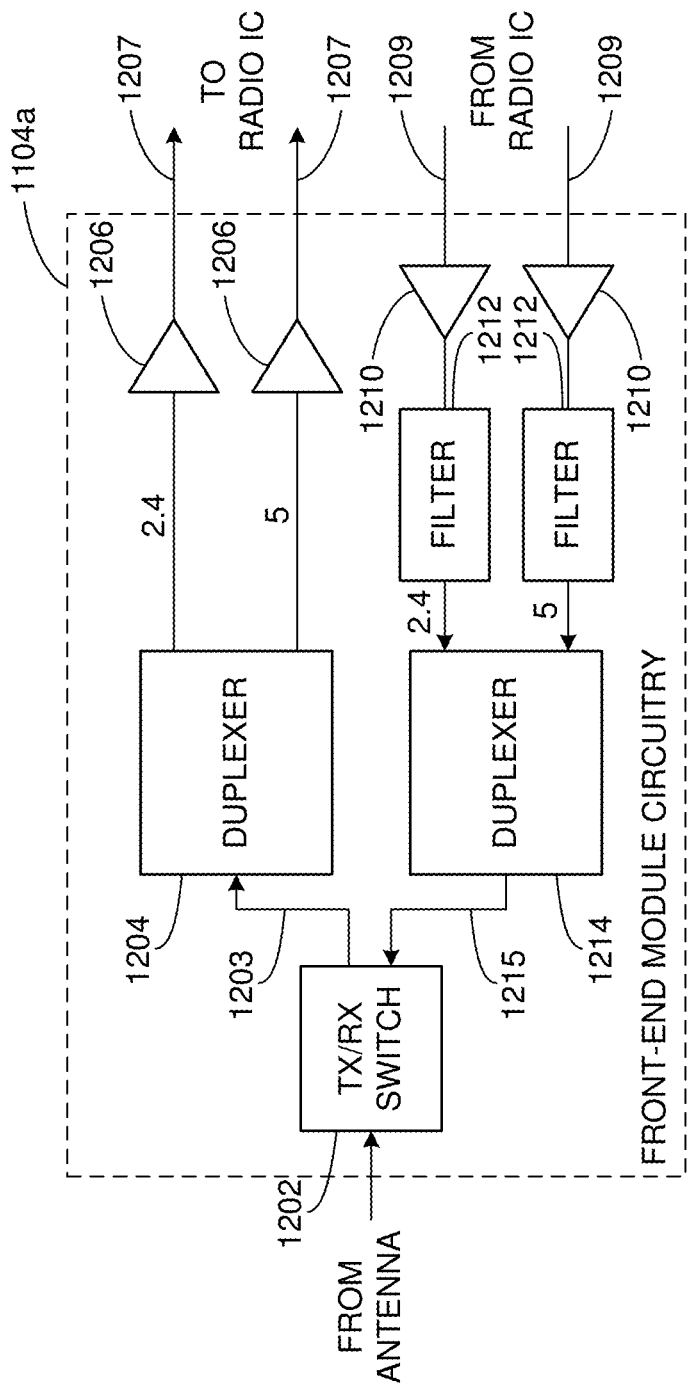
FIG. 12 illustrates an example front-end module circuitry for use in the radio architecture of FIG. 11, in accordance with one or more example embodiments of the present disclosure.

FIG. 12 illustrates WLAN FEM circuitry 1104*a* in accordance with some embodiments. Although the example of FIG. 12 is described in conjunction with the WLAN FEM circuitry 1104*a*, the example of FIG. 12 may be described in conjunction with the example BT FEM circuitry 1104*b* (FIG. 11), although other circuitry configurations may also be suitable.

In some embodiments, the FEM circuitry 1104*a* may include a TX/RX switch 1202 to switch between transmit mode and receive mode operation. The FEM circuitry 1104*a* may include a receive signal path and a transmit signal path. The receive signal path of the FEM circuitry 1104*a* may include a low-noise amplifier (LNA) 1206 to amplify received RF signals 1203 and provide the amplified received RF signals 1207 as an output (e.g., to the radio IC circuitry 1106*a-b* (FIG. 11)). The transmit signal path of the circuitry 1104*a* may include a power amplifier (PA) to amplify input RF signals 1209 (e.g., provided by the radio IC circuitry 1106*a-b*), and one or more filters 1212, such as band-pass filters (BPFs), low-pass filters (LPFs) or other types of filters, to generate RF signals 1215 for subsequent transmission (e.g., by one or more of the antennas 1101 (FIG. 11)) via an example duplexer 1214.

In some dual-mode embodiments for Wi-Fi communication, the FEM circuitry 1104*a* may be configured to operate in either the 2.4 GHz frequency spectrum or the 5 GHz frequency spectrum. In these embodiments, the receive signal path of the FEM circuitry 1104*a* may include a receive signal path duplexer 1204 to separate the signals from each spectrum as well as provide a separate LNA 1206 for each spectrum as shown. In these embodiments, the transmit signal path of the FEM circuitry 1104*a* may also include a power amplifier 1210 and a filter 1212, such as a BPF, an LPF or another type of filter for each frequency spectrum and a transmit signal path duplexer 1204 to provide the signals of one of the different spectrums onto a single transmit path for subsequent transmission by the one or more of the antennas 1101 (FIG. 11). In some embodiments, BT communications may utilize the 2.4 GHz signal paths and may utilize the same FEM circuitry 1104a as the one used for WLAN communications.

Figure 13:
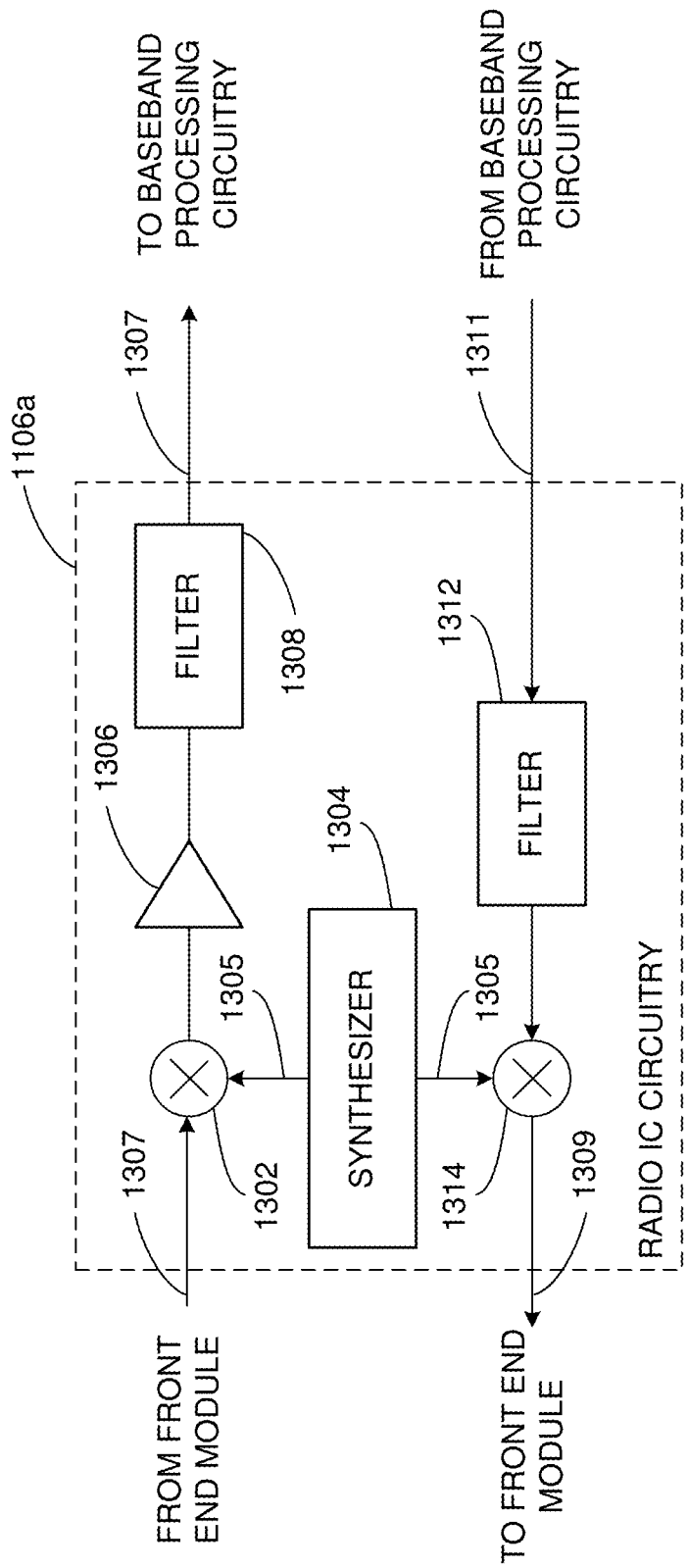
FIG. 13 illustrates an example radio IC circuitry for use in the radio architecture of FIG. 11, in accordance with one or more example embodiments of the present disclosure.

FIG. 13 illustrates radio IC circuitry 1106a in accordance with some embodiments. The radio IC circuitry 1106a is one example of circuitry that may be suitable for use as the WLAN or BT radio IC circuitry 1106a/1106b (FIG. 11), although other circuitry configurations may also be suitable. Alternatively, the example of FIG. 13 may be described in conjunction with the example BT radio IC circuitry 1106b.

In some embodiments, the radio IC circuitry 1106a may include a receive signal path and a transmit signal path. The receive signal path of the radio IC circuitry 1106a may include at least mixer circuitry 1302, such as, for example, down-conversion mixer circuitry, amplifier circuitry 1306 and filter circuitry 1308. The transmit signal path of the radio IC circuitry 1106a may include at least filter circuitry 1312 and mixer circuitry 1314, such as, for example, up-conversion mixer circuitry. Radio IC circuitry 1106a may also include synthesizer circuitry 1304 for synthesizing a frequency 1305 for use by the mixer circuitry 1302 and the mixer circuitry 1314. The mixer circuitry 1302 and/or 1314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 13 illustrates only a simplified version of a radio IC circuitry, and may include, although not shown, embodiments where each of the depicted circuitries may include more than one component. For instance, mixer circuitry 1314 may each include one or more mixers, and filter circuitries 1308 and/or 1312 may each include one or more filters, such as one or more BPFs and/or LPFs according to application needs. For example, when mixer circuitries are of the direct-conversion type, they may each include two or more mixers.

In some embodiments, mixer circuitry 1302 may be configured to down-convert RF signals 1307 received from the FEM circuitry 1104a-b (FIG. 11) based on the synthesized frequency 1305 provided by synthesizer circuitry 1304. The amplifier circuitry 1306 may be configured to amplify the down-converted signals and the filter circuitry 1308 may include an LPF configured to remove unwanted signals from the down-converted signals to generate output baseband signals 1307. Output baseband signals 1307 may be provided to the baseband processing circuitry 1108a-b (FIG. 11) for further processing. In some embodiments, the output baseband signals 1307 may be zero-frequency baseband signals, although this is not a requirement. In some embodiments, mixer circuitry 1302 may comprise passive mixers, although the scope of the embodiments is not limited in this respect.

In some embodiments, the mixer circuitry 1314 may be configured to up-convert input baseband signals 1311 based on the synthesized frequency 1305 provided by the synthesizer circuitry 1304 to generate RF output signals 1209 for the FEM circuitry 1104a-b. The baseband signals 1311 may be provided by the baseband processing circuitry 1108a-b and may be filtered by filter circuitry 1312. The filter circuitry 1312 may include an LPF or a BPF, although the scope of the embodiments is not limited in this respect.

In some embodiments, the mixer circuitry 1302 and the mixer circuitry 1314 may each include two or more mixers and may be arranged for quadrature down-conversion and/or up-conversion respectively with the help of synthesizer 1304. In some embodiments, the mixer circuitry 1302 and the mixer circuitry 1314 may each include two or more mixers each configured for image rejection (e.g., Hartley image rejection). In some embodiments, the mixer circuitry 1302 and the mixer circuitry 1314 may be arranged for direct down-conversion and/or direct up-conversion, respectively. In some embodiments, the mixer circuitry 1302 and the mixer circuitry 1314 may be configured for super-heterodyne operation, although this is not a requirement.

Mixer circuitry 1302 may comprise, according to one embodiment: quadrature passive mixers (e.g., for the in-phase (I) and quadrature phase (Q) paths). In such an embodiment, RF input signal 1207 from FIG. 13 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1305 of synthesizer 1304 (FIG. 13). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1207 (FIG. 12) may comprise a balanced signal, although the scope of the embodiments is not limited in this respect. The I and Q baseband output signals may be provided to low-noise amplifier, such as amplifier circuitry 1306 (FIG. 13) or to filter circuitry 1308 (FIG. 13).

In some embodiments, the output baseband signals 1307 and the input baseband signals 1311 may be analog baseband signals, although the scope of the embodiments is not limited in this respect. In some alternate embodiments, the output baseband signals 1307 and the input baseband signals 1311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1304 may be a fractional-N synthesizer or a fractional N/N+1 synthesizer, although the scope of the embodiments is not limited in this respect as other types of frequency synthesizers may be suitable. For example, synthesizer circuitry 1304 may be a delta-sigma synthesizer, a frequency multiplier, or a synthesizer comprising a phase-locked loop with a frequency divider. According to some embodiments, the synthesizer circuitry 1304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 1304 may be provided by a voltage controlled oscillator (VCO), although that is not a requirement. A divider control input may further be provided by either the baseband processing circuitry 1108*a-b* (FIG. 11) depending on the desired output frequency 1305. In some embodiments, a divider control input (e.g., N) may be determined from a look-up table (e.g., within a Wi-Fi card) based on a channel number and a channel center frequency as determined or indicated by the example application processor 1110. The application processor 1110 may include, or otherwise be connected to, one of the example secure signal converter 101 or the example received signal converter 103 (e.g., depending on which device the example radio architecture is implemented in).

In some embodiments, synthesizer circuitry 1304 may be configured to generate a carrier frequency as the output frequency 1305, while in other embodiments, the output frequency 1305 may be a fraction of the carrier frequency (e.g., one-half the carrier frequency, one-third the carrier frequency). In some embodiments, the output frequency 1305 may be a LO frequency (fLO).

Figure 14:
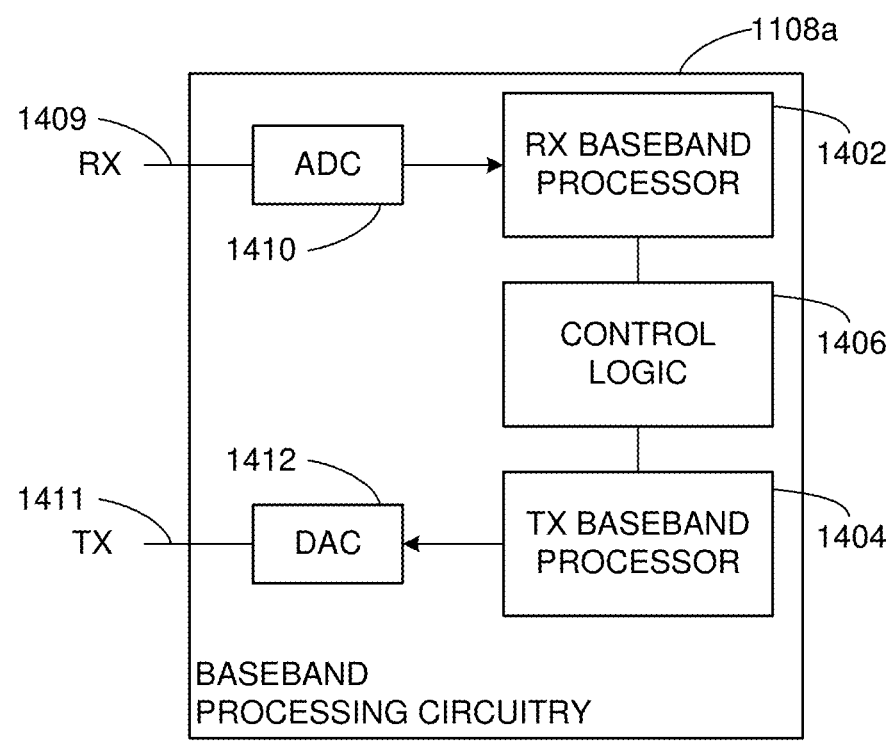
FIG. 14 illustrates an example baseband processing circuitry for use in the radio architecture of FIG. 11, in accordance with one or more example embodiments of the present disclosure.

FIG. 14 illustrates a functional block diagram of baseband processing circuitry 1108*a* in accordance with some embodiments. The baseband processing circuitry 1108*a* is one example of circuitry that may be suitable for use as the baseband processing circuitry 1108*a* (FIG. 11), although other circuitry configurations may also be suitable. Alternatively, the example of FIG. 13 may be used to implement the example BT baseband processing circuitry 1108*b* of FIG. 11.

The baseband processing circuitry 1108*a* may include a receive baseband processor (RX BBP) 1402 for processing receive baseband signals 1309 provided by the radio IC circuitry 1106*a-b* (FIG. 11) and a transmit baseband processor (TX BBP) 1404 for generating transmit baseband signals 1311 for the radio IC circuitry 1106*a-b*. The baseband processing circuitry 1108*a* may also include control logic 1406 for coordinating the operations of the baseband processing circuitry 1108*a*.

In some embodiments (e.g., when analog baseband signals are exchanged between the baseband processing circuitry 1108*a-b* and the radio IC circuitry 1106*a-b*), the baseband processing circuitry 1108*a* may include ADC 1410 to convert analog baseband signals 1409 received from the radio IC circuitry 1106*a-b* to digital baseband signals for processing by the RX BBP 1402. In these embodiments, the baseband processing circuitry 1108*a* may also include DAC 1412 to convert digital baseband signals from the TX BBP 1404 to analog baseband signals 1411.

In some embodiments that communicate OFDM signals or OFDMA signals, such as through baseband processor 1108*a*, the transmit baseband processor 1404 may be configured to generate OFDM or OFDMA signals as appropriate for transmission by performing an inverse fast Fourier transform (IFFT). The receive baseband processor 1402 may be configured to process received OFDM signals or OFDMA signals by performing an FFT. In some embodiments, the receive baseband processor 1402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 11, in some embodiments, the antennas 1101 (FIG. 11) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1101 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: establish two or more links with a non-access point (AP) multi-link device (MLD); connect a first AP of the AP MLD to a first station device (STA) of the non-AP MLD using a first link; connect a second AP of the AP MLD to a second STA of the non-AP MLD using a second link; use a link bitmap field included in a frame, wherein the link bitmap field comprises a first bit associated with the first STA and a second bit associated with the second STA; and communicate with the non-AP MLD based on the link bitmap.

Example 2 may include the device of example 1 and/or some other example herein, wherein a link bitmap size indicates a size of the link bitmap field.

Example 3 may include the device of example 2 and/or some other example herein, wherein the link bitmap size equal to 0 indicates that the link bitmap field may be 2-bit long, wherein the link bitmap size equal to 1 indicates that the link bitmap field may be 4-bit long, wherein the link bitmap size equal to 2 indicates that the link bitmap field may be 8-bit long, and wherein the link bitmap size equal to 3 indicates that the link bitmap field may be 16-bit long.

Example 4 may include the device of example 1 and/or some other example herein, wherein the first bit of the link bitmap field being set to 1 indicates that the first STA may be in a awake state, and wherein the first bit of the link bitmap field being set to 0 indicates that the first STA may be in a doze state.

Example 5 may include the device of example 1 and/or some other example herein, wherein to communicate with the non-AP MLD comprises the processing circuitry being further configured to send data on a link of the two or more links based on a corresponding bit of the link bitmap field being set to 1.

Example 6 may include the device of example 1 and/or some other example herein, wherein the processing circuitry may be further configured to: identify a trigger frame received on a link of the two or more links from the non-AP MLD, wherein the trigger frame does not include the link bitmap field; and communicate with the non-AP MLD on the link of the two or more links.

Example 7 may include the device of example 1 and/or some other example herein, wherein the processing circuitry may be further configured to: generate a data frame to be sent to the non-AP MLD on the first link; set an end of a service period (EOSP) field of the data frame to be equal to 0 or 1 indicating a status of the service period; set a more data field to 0 or 1 indicating whether there are more data frames to be sent to the non-AP MLD; include a first link bitmap field in the data frame; and communicate with the non-AP MLD on the first link or the second link based on a first link bitmap field included in the data frame.

Example 8 may include the device of example 1 and/or some other example herein, wherein the processing circuitry may be further configured to: identify a data frame received from the non-AP MLD on the first link; determine a power management (PM) bit in the data frame; determine a link bitmap field in the data frame; and apply the PM bit to the first link and the second link based on the link bitmap field.

Example 9 may include the device of example 1 and/or some other example herein, further comprising a transceiver configured to transmit and receive wireless signals.

Example 10 may include the device of example 9 and/or some other example herein, further comprising an antenna coupled to the transceiver to exchange one or more frames with the non-AP MLD.

Example 11 may include a non-transitory computer-readable medium storing computer-executable instructions which when executed by one or more processors result in performing operations comprising: establishing two or more links with a non-access point (AP) multi-link device (MLD); connecting a first AP of the AP MLD to a first station device (STA) of the non-AP MLD using a first link; connecting a second AP of the AP MLD to a second STA of the non-AP MLD using a second link; using a link bitmap field included in a frame, wherein the link bitmap field comprises a first bit associated with the first STA and a second bit associated with the second STA; and communicating with the non-AP MLD based on the link bitmap.

Example 12 may include the non-transitory computer-readable medium of example 11 and/or some other example herein, wherein a link bitmap size indicates a size of the link bitmap field.

Example 13 may include the non-transitory computer-readable medium of example 12 and/or some other example herein, wherein the link bitmap size equal to 0 indicates that the link bitmap field may be 2-bit long, wherein the link bitmap size equal to 1 indicates that the link bitmap field may be 4-bit long, wherein the link bitmap size equal to 2 indicates that the link bitmap field may be 8-bit long, and wherein the link bitmap size equal to 3 indicates that the link bitmap field may be 16-bit long.

Example 14 may include the non-transitory computer-readable medium of example 11 and/or some other example herein, wherein the first bit of the link bitmap field being set to 1 indicates that the first STA may be in a awake state, and wherein the first bit of the link bitmap field being set to 0 indicates that the first STA may be in a doze state.

Example 15 may include the non-transitory computer-readable medium of example 11 and/or some other example herein, wherein to communicate with the non-AP MLD comprises the processing circuitry being further configured to send data on a link of the two or more links based on a corresponding bit of the link bitmap field being set to 1.

Example 16 may include the non-transitory computer-readable medium of example 11 and/or some other example herein, wherein the operations further comprise: identifying a trigger frame received on a link of the two or more links from the non-AP MLD, wherein the trigger frame does not include the link bitmap field; and communicating with the non-AP MLD on the link of the two or more links.

Example 17 may include the non-transitory computer-readable medium of example 11 and/or some other example herein, wherein the operations further comprise: generating a data frame to be sent to the non-AP MLD on the first link; setting an end of a service period (EOSP) field of the data frame to be equal to 0 or 1 indicating a status of the service period; setting a more data field to 0 or 1 indicating whether there are more data frames to be sent to the non-AP MLD; including a first link bitmap field in the data frame; and communicating with the non-AP MLD on the first link or the second link based on a first link bitmap field included in the data frame.

Example 18 may include the non-transitory computer-readable medium of example 11 and/or some other example herein, wherein the operations further comprise: identifying a data frame received from the non-AP MLD on the first link; determining a power management (PM) bit in the data frame; determining a link bitmap field in the data frame; and apply the PM bit to the first link and the second link based on the link bitmap field.

Example 19 may include a method comprising: establishing, by one or more processors, two or more links with a non-access point (AP) multi-link device (MLD); connecting a first AP of the AP MLD to a first station device (STA) of the non-AP MLD using a first link; connecting a second AP of the AP MLD to a second STA of the non-AP MLD using a second link; using a link bitmap field included in a frame, wherein the link bitmap field comprises a first bit associated with the first STA and a second bit associated with the second STA; and communicating with the non-AP MLD based on the link bitmap.

Example 20 may include the method of example 19 and/or some other example herein, wherein a link bitmap size indicates a size of the link bitmap field.

Example 21 may include the method of example 20 and/or some other example herein, wherein the link bitmap size equal to 0 indicates that the link bitmap field may be 2-bit long, wherein the link bitmap size equal to 1 indicates that the link bitmap field may be 4-bit long, wherein the link bitmap size equal to 2 indicates that the link bitmap field may be 8-bit long, and wherein the link bitmap size equal to 3 indicates that the link bitmap field may be 16-bit long.

Example 22 may include the method of example 19 and/or some other example herein, wherein the first bit of the link bitmap field being set to 1 indicates that the first STA may be in a awake state, and wherein the first bit of the link bitmap field being set to 0 indicates that the first STA may be in a doze state.

Example 23 may include the method of example 19 and/or some other example herein, wherein to communicate with the non-AP MLD comprises the processing circuitry being further configured to send data on a link of the two or more links based on a corresponding bit of the link bitmap field being set to 1.

Example 24 may include the method of example 19 and/or some other example herein, further comprising: identifying a trigger frame received on a link of the two or more links from the non-AP MLD, wherein the trigger frame does not include the link bitmap field; and communicating with the non-AP MLD on the link of the two or more links.

Example 25 may include the method of example 19 and/or some other example herein, further comprising: generating a data frame to be sent to the non-AP MLD on the first link; setting an end of a service period (EOSP) field of the data frame to be equal to 0 or 1 indicating a status of the service period; setting a more data field to 0 or 1 indicating whether there are more data frames to be sent to the non-AP MLD including a first link bitmap field in the data frame; and communicating with the non-AP MLD on the first link or the second link based on a first link bitmap field included in the data frame.

Example 26 may include the method of example 19 and/or some other example herein, further comprising: identifying a data frame received from the non-AP MLD on the first link; determining a power management (PM) bit in the data frame; determining a link bitmap field in the data frame; and apply the PM bit to the first link and the second link based on the link bitmap field.

Example 27 may include an apparatus comprising means for: establishing two or more links with a non-access point (AP) multi-link device (MLD); connecting a first AP of the AP MLD to a first station device (STA) of the non-AP MLD using a first link; connecting a second AP of the AP MLD to a second STA of the non-AP MLD using a second link; using a link bitmap field included in a frame, wherein the link bitmap field comprises a first bit associated with the first STA and a second bit associated with the second STA; and communicating with the non-AP MLD based on the link bitmap.

Example 28 may include the apparatus of example 27 and/or some other example herein, wherein a link bitmap size indicates a size of the link bitmap field.

Example 29 may include the apparatus of example 28 and/or some other example herein, wherein the link bitmap size equal to 0 indicates that the link bitmap field may be 2-bit long, wherein the link bitmap size equal to 1 indicates that the link bitmap field may be 4-bit long, wherein the link bitmap size equal to 2 indicates that the link bitmap field may be 8-bit long, and wherein the link bitmap size equal to 3 indicates that the link bitmap field may be 16-bit long.

Example 30 may include the apparatus of example 27 and/or some other example herein, wherein the first bit of the link bitmap field being set to 1 indicates that the first STA may be in a awake state, and wherein the first bit of the link bitmap field being set to 0 indicates that the first STA may be in a doze state.

Example 31 may include the apparatus of example 27 and/or some other example herein, wherein to communicate with the non-AP MLD comprises the processing circuitry being further configured to send data on a link of the two or more links based on a corresponding bit of the link bitmap field being set to 1.

Example 32 may include the apparatus of example 27 and/or some other example herein, further comprising: identifying a trigger frame received on a link of the two or more links from the non-AP MLD, wherein the trigger frame does not include the link bitmap field; and communicating with the non-AP MLD on the link of the two or more links.

Example 33 may include the apparatus of example 27 and/or some other example herein, further comprising: generating a data frame to be sent to the non-AP MLD on the first link; setting an end of a service period (EOSP) field of the data frame to be equal to 0 or 1 indicating a status of the service period; setting a more data field to 0 or 1 indicating whether there are more data frames to be sent to the non-AP MLD; including a first link bitmap field in the data frame; and communicating with the non-AP MLD on the first link or the second link based on a first link bitmap field included in the data frame.

Example 34 may include the apparatus of example 27 and/or some other example herein, further comprising: identifying a data frame received from the non-AP MLD on the first link; determining a power management (PM) bit in the data frame; determining a link bitmap field in the data frame; and apply the PM bit to the first link and the second link based on the link bitmap field.

Example 35 may include one or more non-transitory computer-readable media comprising instructions to cause an electronic device, upon execution of the instructions by one or more processors of the electronic device, to perform one or more elements of a method described in or related to any of examples 1-34, or any other method or process described herein.

Example 36 may include an apparatus comprising logic, modules, and/or circuitry to perform one or more elements of a method described in or related to any of examples 1-34, or any other method or process described herein.

Example 37 may include a method, technique, or process as described in or related to any of examples 1-34, or portions or parts thereof.

Example 38 may include an apparatus comprising: one or more processors and one or more computer readable media comprising instructions that, when executed by the one or more processors, cause the one or more processors to perform the method, techniques, or process as described in or related to any of examples 1-34, or portions thereof.

Example 39 may include a method of communicating in a wireless network as shown and described herein.

Example 40 may include a system for providing wireless communication as shown and described herein.

Example 41 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
    establish two or more links with a non-access point (AP) multi-link device (MLD);
    connect a first AP of the device to a first station device (STA) of the non-AP MLD using a first link;
    connect a second AP of the device to a second STA of the non-AP MLD using a second link;
    use a link bitmap field included in a frame, wherein the link bitmap field comprises a first bit associated with the first STA and a second bit associated with the second STA, wherein a link bitmap size indicates a size of the link bitmap field, and wherein the link bitmap field is configured to be of a variable size based on a value of a bitmap size indicator, with the variable size set to accommodate the number of STAs linked; and
    communicate with the non-AP MLD based on the link bitmap.

2. The device of claim 1, wherein the link bitmap size equal to 0 indicates that the link bitmap field is 2-bit long, wherein the link bitmap size equal to 1 indicates that the link bitmap field is 4-bit long, wherein the link bitmap size equal to 2 indicates that the link bitmap field is 8-bit long, and wherein the link bitmap size equal to 3 indicates that the link bitmap field is 16-bit long.

3. The device of claim 1, wherein the first bit of the link bitmap field being set to 1 indicates that the first STA is in a awake state, and wherein the first bit of the link bitmap field being set to 0 indicates that the frame does not apply to the first STA.

4. The device of claim 1, wherein to communicate with the non-AP MLD comprises the processing circuitry being further configured to send data on a link of the two or more links based on a corresponding bit of the link bitmap field being set to 1.

5. The device of claim 1, wherein the processing circuitry is further configured to:
    identify a trigger frame received on a link of the two or more links from the non-AP MLD, wherein the trigger frame does not include the link bitmap field; and
    communicate with the non-AP MLD on the link of the two or more links.

6. The device of claim 1, wherein the processing circuitry is further configured to:
    generate a data frame to be sent to the non-AP MLD on the first link;
    set an end of a service period (EOSP) field of the data frame to be equal to 0 or 1 indicating a status of the service period;
    set a more data field to 0 or 1 indicating whether there are more data frames to be sent to the non-AP MLD;
    include a first link bitmap field in the data frame; and
    communicate with the non-AP MLD on the first link or the second link based on a first link bitmap field included in the data frame.

7. The device of claim 1, wherein the processing circuitry is further configured to:
    identify a frame received from the non-AP MLD on the first link;
    determine a power management (PM) bit in the frame;
    determine a link bitmap field in the frame; and
    apply the PM bit to the first link if the first bit of the link bitmap field is set to 1 and apply the PM bit to the second link if the second bit of the link bitmap field is set to 1.

8. The device of claim 1, further comprising a transceiver configured to transmit and receive wireless signals.

9. The device of claim 8, further comprising an antenna coupled to the transceiver to exchange one or more frames with the non-AP MLD.

10. A non-transitory computer-readable medium storing computer-executable instructions which when executed by one or more processors of an access point (AP) multi-link device (MLD) result in performing operations comprising:
    establishing two or more links with a non-access point (AP) multi-link device (MLD);
    connecting a first AP of the AP MLD to a first station device (STA) of the non-AP MLD using a first link;
    connecting a second AP of the AP MLD to a second STA of the non-AP MLD using a second link;
    using a link bitmap field included in a frame, wherein the link bitmap field comprises a first bit associated with the first STA and a second bit associated with the second STA, wherein a link bitmap size indicates a size of the link bitmap field, and wherein the link bitmap field is configured to be of a variable size based on a value of a bitmap size indicator, with the variable size set to accommodate the number of STAs linked; and
communicating with the non-AP MLD based on the link bitmap.

11. The non-transitory computer-readable medium of claim 10, wherein the link bitmap size equal to 0 indicates that the link bitmap field is 2-bit long, wherein the link bitmap size equal to 1 indicates that the link bitmap field is 4-bit long, wherein the link bitmap size equal to 2 indicates that the link bitmap field is 8-bit long, and wherein the link bitmap size equal to 3 indicates that the link bitmap field is 16-bit long.

12. The non-transitory computer-readable medium of claim 10, wherein the first bit of the link bitmap field being set to 1 indicates that the first STA is in a awake state, and wherein the first bit of the link bitmap field being set to 0 indicates that the frame does not apply to the first STA.

13. The non-transitory computer-readable medium of claim 10, wherein to communicate with the non-AP MLD comprises the processing circuitry being further configured to send data on a link of the two or more links based on a corresponding bit of the link bitmap field being set to 1.

14. The non-transitory computer-readable medium of claim 10, wherein the operations further comprise:
identifying a trigger frame received on a link of the two or more links from the non-AP MLD, wherein the trigger frame does not include the link bitmap field; and
communicating with the non-AP MLD on the link of the two or more links.

15. The non-transitory computer-readable medium of claim 10, wherein the operations further comprise:
generating a data frame to be sent to the non-AP MLD on the first link;
setting an end of a service period (EOSP) field of the data frame to be equal to 0 or 1 indicating a status of the service period;
setting a more data field to 0 or 1 indicating whether there are more data frames to be sent to the non-AP MLD;
including a first link bitmap field in the data frame; and
communicating with the non-AP MLD on the first link or the second link based on a first link bitmap field included in the data frame.

16. The non-transitory computer-readable medium of claim 10, wherein the operations further comprise:
identifying a frame received from the non-AP MLD on the first link;
determining a power management (PM) bit in the frame;
determining a link bitmap field in the frame; and
apply the PM bit to the first link if the first bit of the link bitmap field is set to 1 and apply the PM bit to the second link if the second bit of the link bitmap field is set to 1.

17. A method comprising:
establishing, by one or more processors of an access point (AP) multi-link device (MLD), two or more links with a non-access point (AP) multi-link device (MLD);
connecting a first AP of the AP MLD to a first station device (STA) of the non-AP MLD using a first link;
connecting a second AP of the AP MLD to a second STA of the non-AP MLD using a second link;
using a link bitmap field included in a frame, wherein the link bitmap field comprises a first bit associated with the first STA and a second bit associated with the second STA, wherein a link bitmap size indicates a size of the link bitmap field, and wherein the link bitmap field is configured to be of a variable size based on a value of a bitmap size indicator, with the variable size set to accommodate the number of STAs linked; and
communicating with the non-AP MLD based on the link bitmap.

\* \* \* \* \*